United States Patent
Kani et al.

(10) Patent No.: US 12,290,994 B2
(45) Date of Patent: May 6, 2025

(54) SHAPING METHOD AND SHAPING DEVICE

(71) Applicant: MITSUBISHI HEAVY INDUSTRIES, LTD., Tokyo (JP)

(72) Inventors: Yuki Kani, Tokyo (JP); Ryota Ozaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 351 days.

(21) Appl. No.: 17/771,677

(22) PCT Filed: Jan. 7, 2020

(86) PCT No.: PCT/JP2020/000147
§ 371 (c)(1),
(2) Date: Apr. 25, 2022

(87) PCT Pub. No.: WO2021/140561
PCT Pub. Date: Jul. 15, 2021

(65) Prior Publication Data
US 2022/0379571 A1  Dec. 1, 2022

(51) Int. Cl.
*B29C 70/50* (2006.01)
*B29C 70/54* (2006.01)
(Continued)

(52) U.S. Cl.
CPC .......... *B29C 70/504* (2013.01); *B29C 70/54* (2013.01); *B29K 2105/0872* (2013.01);
(Continued)

(58) Field of Classification Search
CPC ......... B32B 5/02; B32B 5/26; B32B 2250/20; B32B 2260/023; B32B 2260/046;
(Continued)

(56) References Cited

U.S. PATENT DOCUMENTS 5,102,609 A * 4/1992 Miller .................. B29C 53/043
264/339
5,344,602 A * 9/1994 Yencho ................ B29C 53/043
264/510

(Continued)

FOREIGN PATENT DOCUMENTS

JP   S63-109039 A    5/1988
JP   H01-286823 A   11/1989
(Continued)

OTHER PUBLICATIONS

PCT/ISA/210, "International Search Report for PCT International Application No. PCT/JP/2020/000147," Mar. 24, 2020.

*Primary Examiner* — Michael M. Robinson
(74) *Attorney, Agent, or Firm* — HAUPTMAN HAM, LLP

(57) ABSTRACT

A shaping method for shaping a stack produced by layering and forming into a flat shape a plurality of sheet-shaped composite materials includes a first shaping step of shaping the stack along a fold line extending along the longitudinal direction of the stack such that a first region and a second region, which are disposed to sandwich the fold line, form a first bending angle, and a second shaping step of shaping along the fold line the stack shaped via the first shaping step such that the first region and the second region form a second bending angle that is smaller than the first bending angle. In the first shaping step and the second shaping step, the stack is shaped in a state wherein the first region is maintained below the softening temperature of the resin material, while the second region is being heated to the softening temperature or higher.

9 Claims, 13 Drawing Sheets

(51) Int. Cl.
    *B29K 105/08*     (2006.01)
    *B29L 31/00*     (2006.01)
    *B32B 5/02*     (2006.01)
    *B32B 5/26*     (2006.01)

(52) U.S. Cl.
    CPC ........... *B29L 2031/003* (2013.01); *B32B 5/02* (2013.01); *B32B 5/26* (2013.01); *B32B 2250/20* (2013.01); *B32B 2260/023* (2013.01); *B32B 2260/046* (2013.01); *B32B 2262/0269* (2013.01); *B32B 2262/101* (2013.01); *B32B 2262/106* (2013.01)

(58) Field of Classification Search
    CPC ...... B32B 2262/0269; B32B 2262/101; B32B 2262/106
    See application file for complete search history.

(56) References Cited

U.S. PATENT DOCUMENTS

| | | | |
|---|---|---|---|
| 2005/0023728 A1* | 2/2005 | Benson | B29C 70/504 |
| | | | 425/374 |
| 2009/0065977 A1* | 3/2009 | Suzuki | B29C 70/50 |
| | | | 425/383 |
| 2019/0084217 A1 | 3/2019 | Shimono et al. | |
| 2019/0210306 A1 | 7/2019 | Tokutomi | |
| 2020/0391453 A1 | 12/2020 | Morishima et al. | |

FOREIGN PATENT DOCUMENTS

| | | |
|---|---|---|
| JP | 2007-501140 A | 1/2007 |
| JP | 2009-193951 A | 8/2009 |
| JP | 2009-234211 A | 10/2009 |
| JP | 2010-120167 A | 6/2010 |
| JP | 2010-173166 A | 8/2010 |
| JP | 2017-128095 A | 7/2017 |
| WO | 2007/102573 A1 | 9/2007 |
| WO | 2018/012269 A1 | 1/2018 |
| WO | 2018/047869 A1 | 3/2018 |

* cited by examiner

SHAPING METHOD AND SHAPING DEVICE

RELATED APPLICATIONS

The present application is National Phase of International Application No. PCT/JP2020/000147 filed Jan. 7, 2020, the disclosure of which is hereby incorporated by reference herein in its entirety.

TECHNICAL FIELD

The present disclosure relates to a shaping method of shaping a laminate that is formed in a flat shape by laminating sheet-shaped composite materials and a shaping device.

BACKGROUND ART

In the related art, as a method of forming a composite material in which a curved corner portion is formed, a method of manufacturing a preform that is formed by bringing a reinforcing fiber laminate into close contact with a shaping die serving as a male die is known (for example, refer to PTL 1). In the preform manufacturing method disclosed in PTL 1, the reinforcing fiber laminate is installed on the male die and covered with a bagging film and the internal atmosphere of the bagging film that is sealed airtightly is evacuated and heated so that the laminate is densified.

CITATION LIST

Patent Literature

[PTL 1] Japanese Unexamined Patent Application Publication No. 2010-120167

SUMMARY OF INVENTION

Technical Problem

With the manufacturing method in PTL 1, it is possible to densify the laminate while shaping the laminate. However, the laminate needs to be installed on a second forming die, covered with a bagging film, pressed, and heated after the laminate is installed on a first forming die, covered with a bagging film, pressed, and heated so that the laminate is shaped and densified in a stepwise manner. Therefore, a relatively long time is taken to form the laminate.

In recent years, there is an increasing need for shortening a time taken to form a composite material and development of a technique of continuously forming a long component is being progressed, for example. To form a flat laminate into a component having a predetermined cross-sectional shape, a step (a shaping step) of bending the laminate needs to be performed. However, to release a stress generated in the laminate in the shaping step, it is necessary to cause interlayer slip deformation between a plurality of sheet-shaped composite materials constituting the laminate. The slip deformation is accelerated when the laminate is heated and the viscosity of a resin material is decreased at the time of the shaping of the laminate.

However, a position where the slip deformation does not need to be caused like a position where almost no stress is generated inside is heated at the time of the shaping of the laminate, the slip deformation occurs at the position and the laminate is not shaped desirably, which causes a forming failure.

An object of the present disclosure is to provide a shaping method and a shaping device that suppress a problem that the entire vicinity of a fold line is heated and thus a laminate that is formed into a flat shape by laminating a plurality of sheet-shaped composite materials each including a fiber base material and a resin material is not shaped desirably when the laminate is shaped along the fold line.

Solution to Problem

According to an aspect of the present disclosure, there is provided a shaping method of shaping a laminate that is formed in a flat shape by laminating a plurality of sheet-shaped composite materials each including a fiber base material and a resin material, the method including a first shaping step of shaping the laminate along a fold line extending along a longitudinal direction of the laminate such that a first bending angle is formed between a first region and a second region that are disposed with the fold line interposed therebetween and a second shaping step of shaping the laminate shaped in the first shaping step along the fold line such that a second bending angle smaller than the first bending angle is formed between the first region and the second region. In the first shaping step and the second shaping step, the laminate is shaped in a state where a temperature of the first region is maintained at a temperature lower than a softening point of the resin material and the second region is heated to a temperature equal to or higher than the softening point.

According to an aspect of the present disclosure, there is provided a shaping device which shapes a laminate that is formed in a flat shape by laminating a plurality of sheet-shaped composite materials each including a fiber base material and a resin material, the device including a first shaping unit that shapes the laminate along a fold line extending along a longitudinal direction of the laminate such that a first bending angle is formed between a first region and a second region that are disposed with the fold line interposed therebetween and a second shaping unit that shapes the laminate shaped by the first shaping unit along the fold line such that a second bending angle smaller than the first bending angle is formed between the first region and the second region. The first shaping unit and the second shaping unit shape the laminate in a state where a temperature of the first region is maintained at a temperature lower than a softening point of the resin material and the second region is heated to a temperature equal to or higher than the softening point.

Advantageous Effects of Invention

According to the aspects of the present disclosure, it is possible to provide a shaping method and a shaping device that suppress a problem that the entire vicinity of a fold line is heated and thus a laminate that is formed into a flat shape by laminating a plurality of sheet-shaped composite materials each including a fiber base material and a resin material is not shaped desirably when the laminate is shaped along the fold line.

DESCRIPTION OF EMBODIMENTS

First Embodiment

Figure 1:
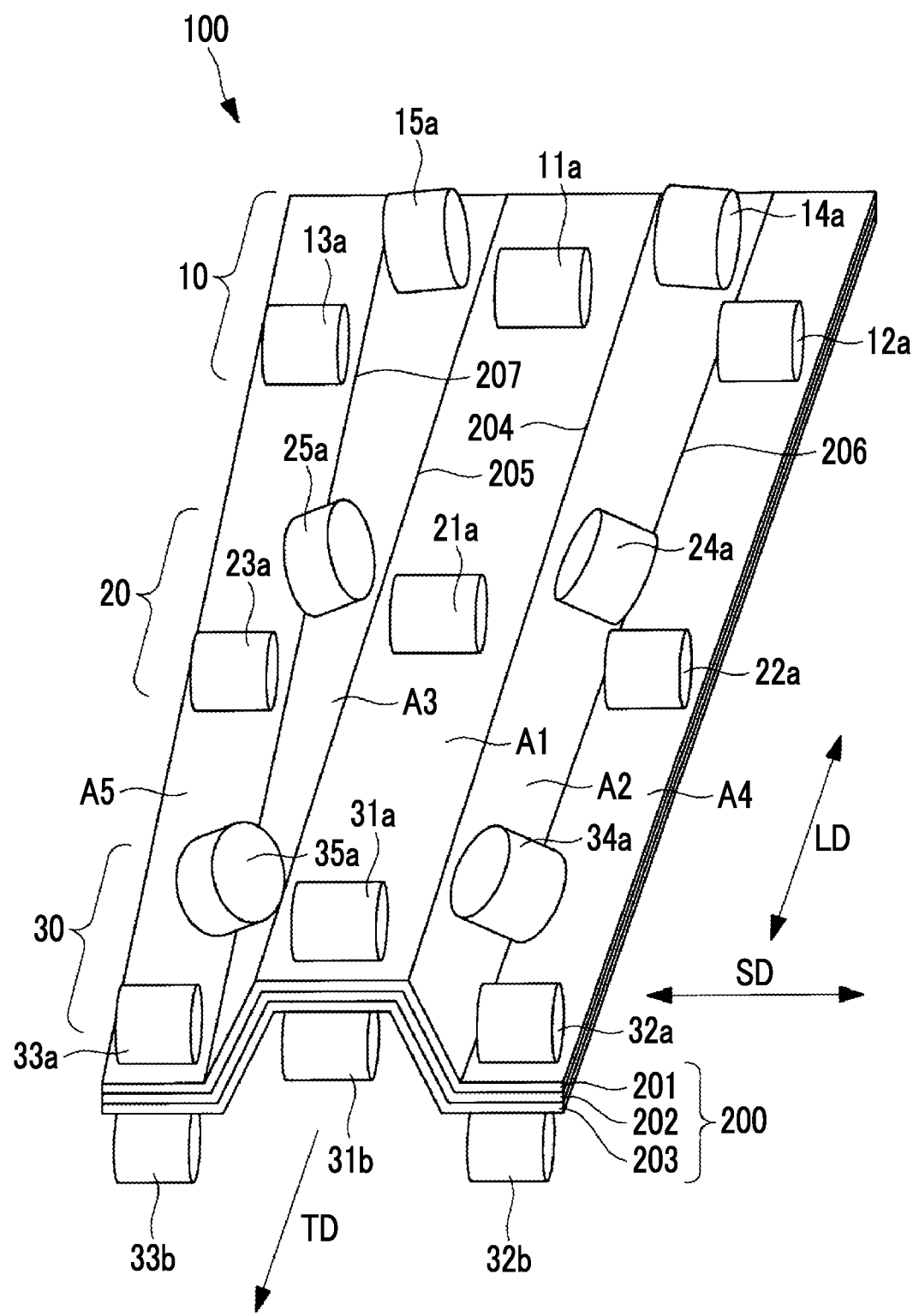
FIG. 1 is a perspective view showing a shaping device according to a first embodiment of the present disclosure.
Figure 2:
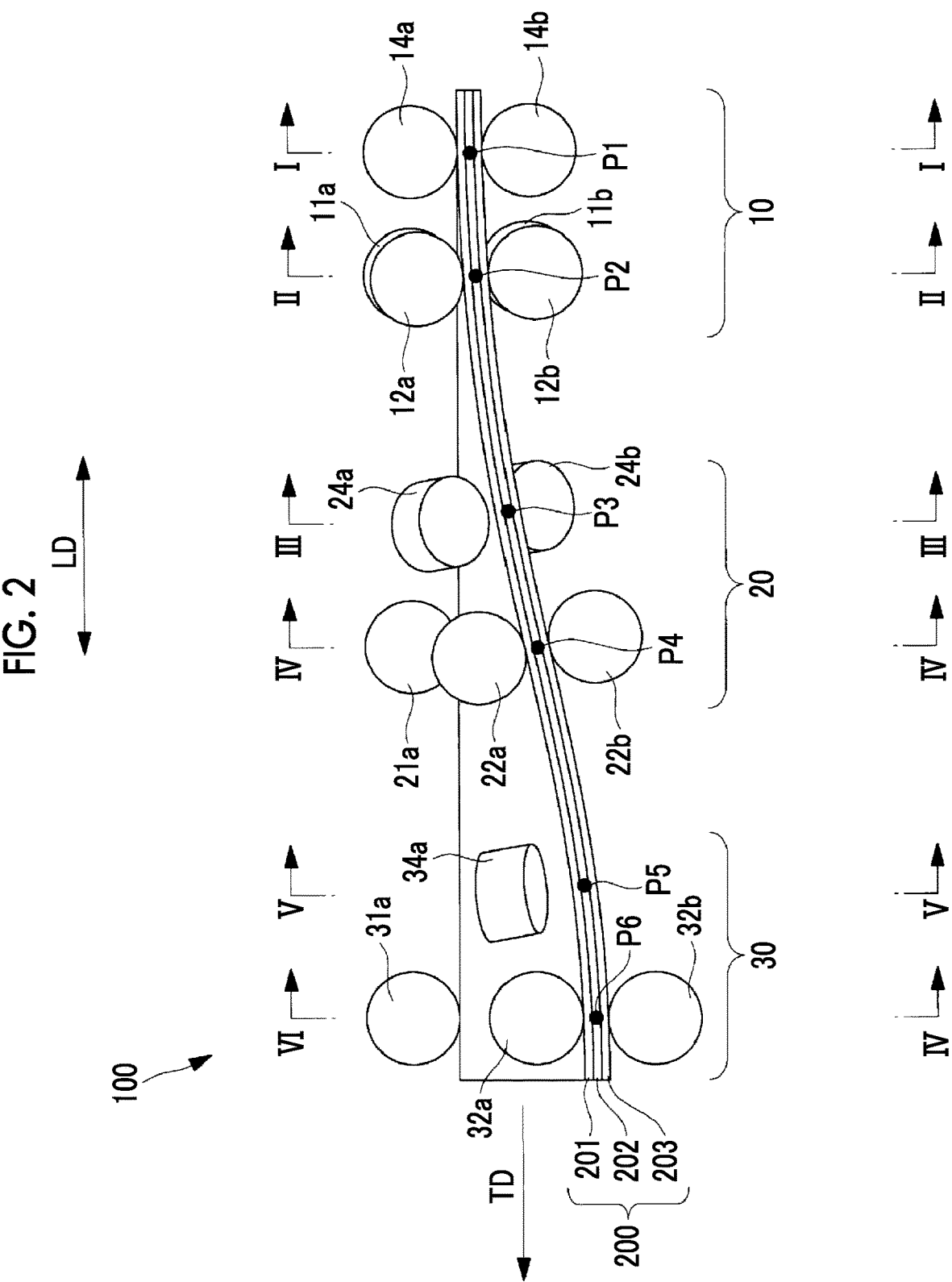
FIG. 2 is a side view showing the shaping device shown in FIG. 1 as seen in a lateral direction of a laminate.
Figure 3:
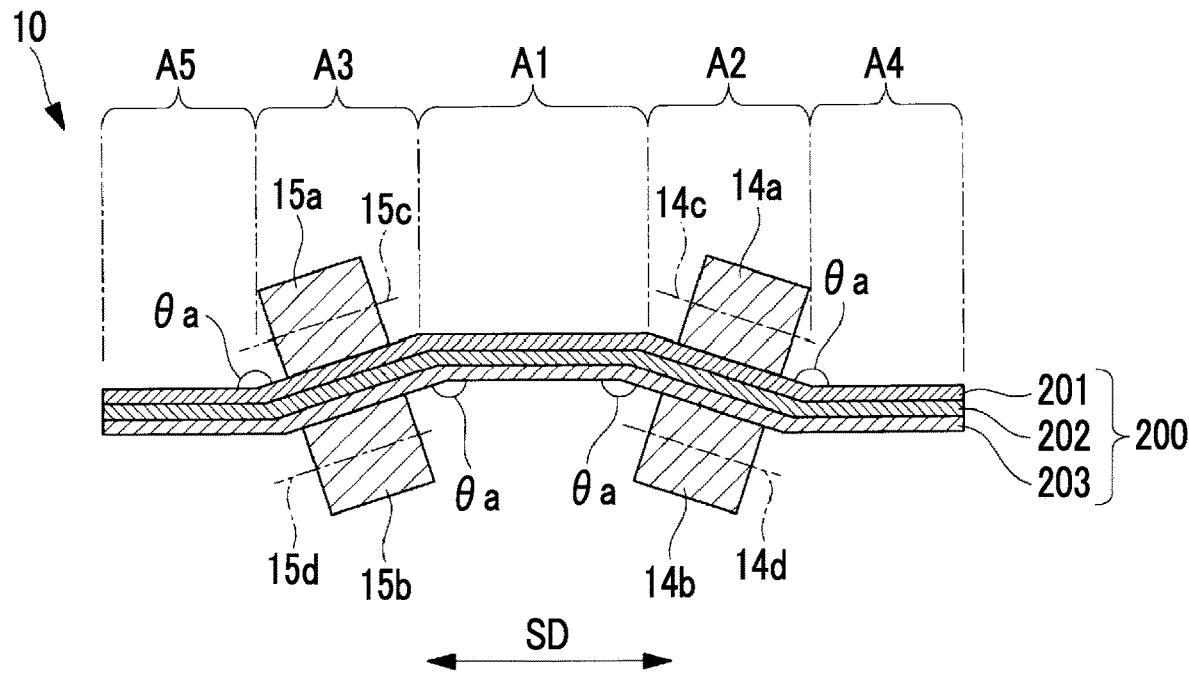
FIG. 3 is a cross-sectional view taken along line I-I which shows the shaping device shown in FIG. 2 as seen along arrows.
Figure 4:
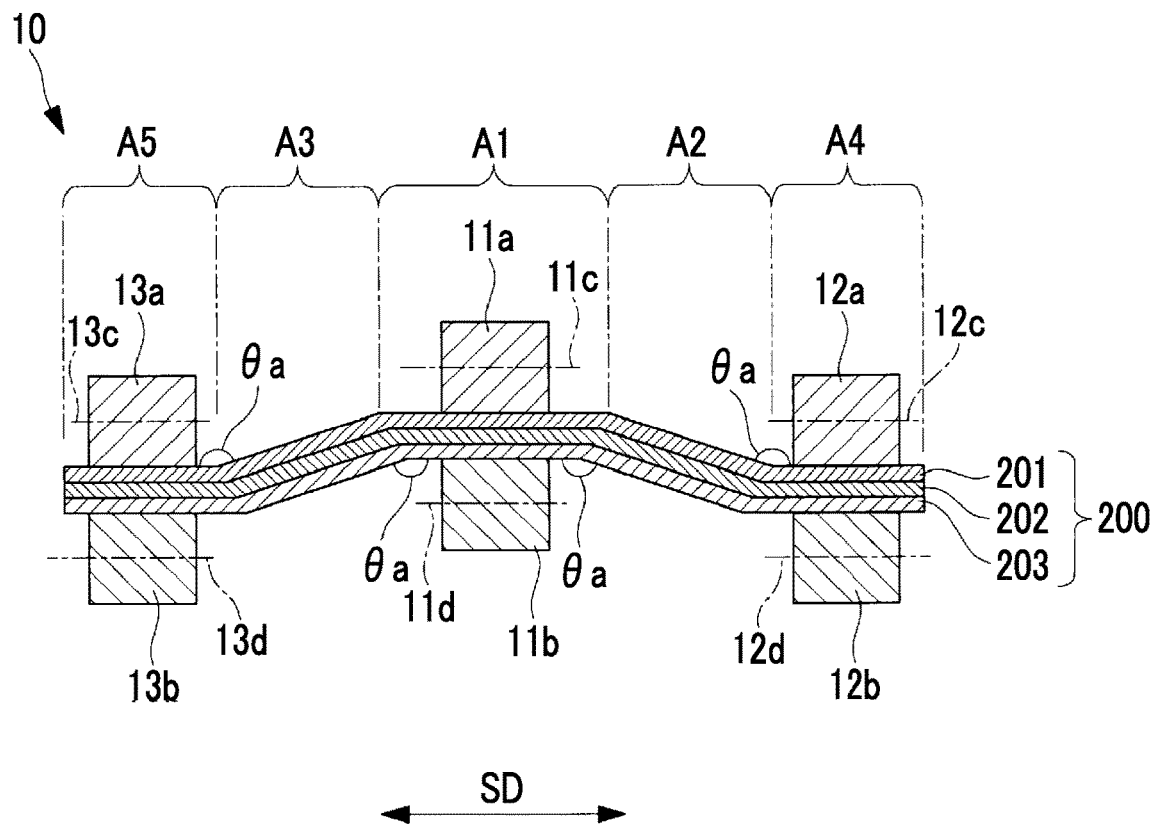
FIG. 4 is a cross-sectional view taken along line II-II which shows the shaping device shown in FIG. 2 as seen along arrows.
Figure 5:
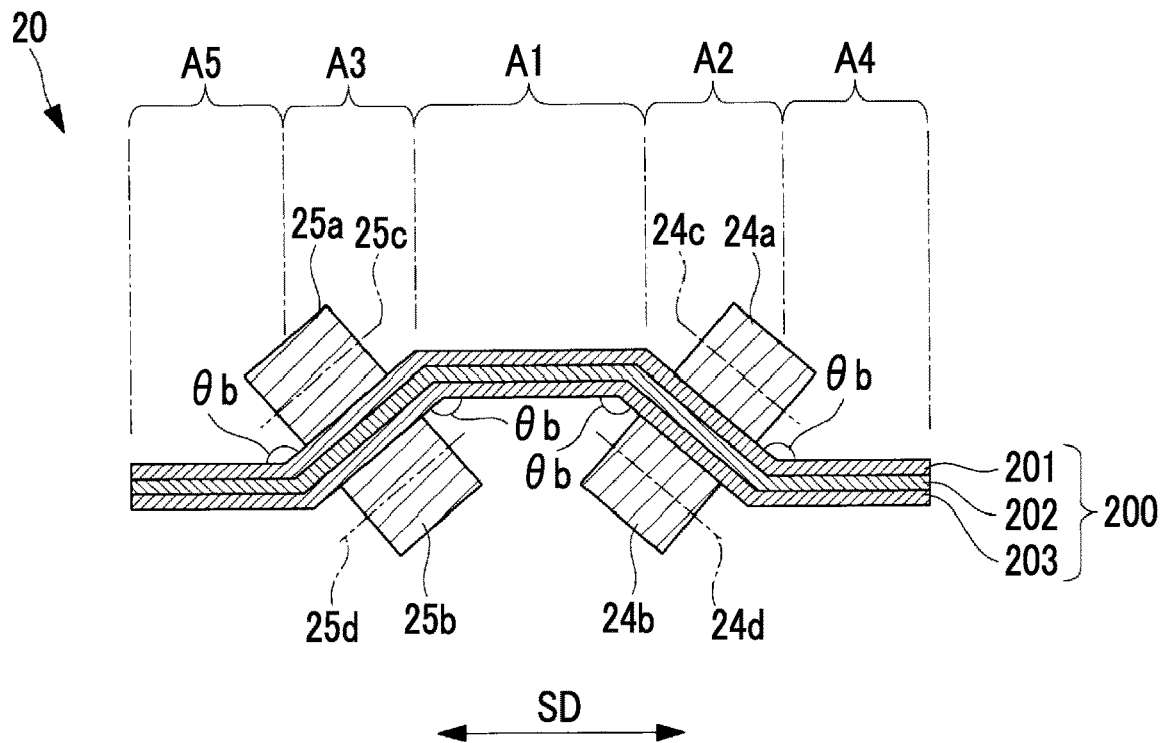
FIG. 5 is a cross-sectional view taken along line III-III which shows the shaping device shown in FIG. 2 as seen along arrows.
Figure 6:
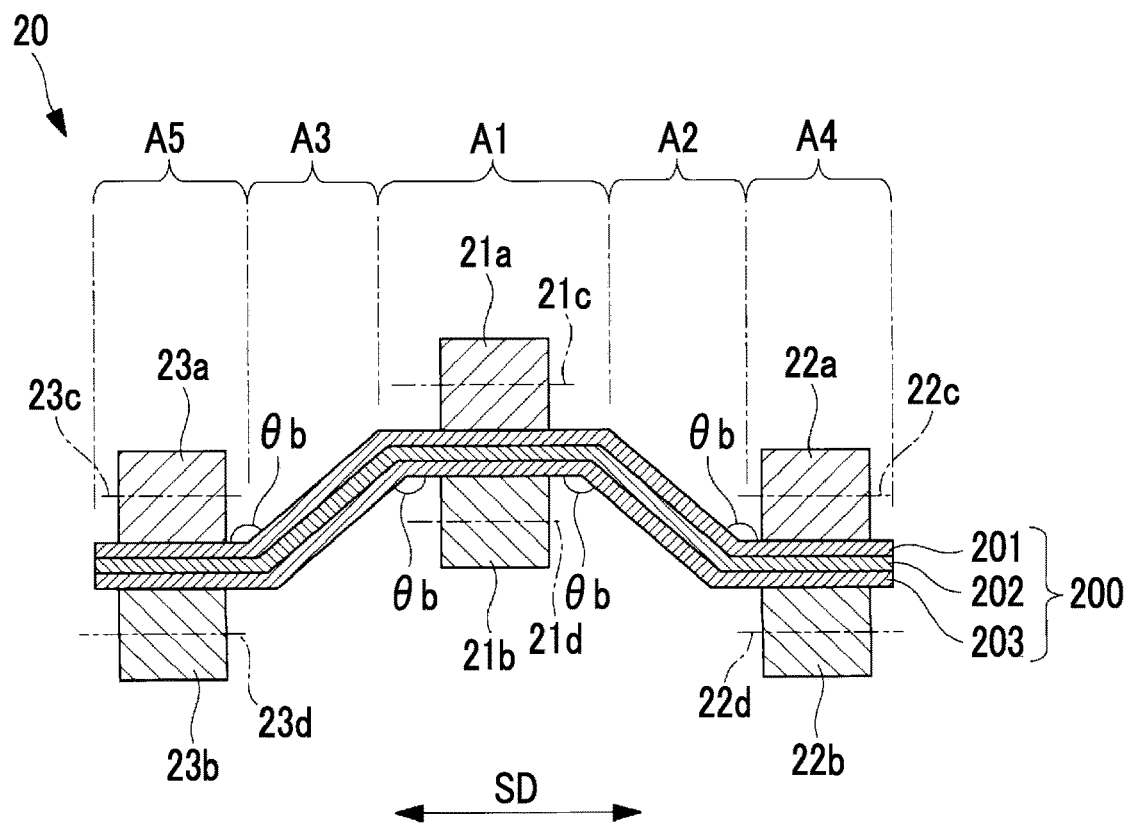
FIG. 6 is a cross-sectional view taken along line IV-IV which shows the shaping device shown in FIG. 2 as seen along arrows.
Figure 7:
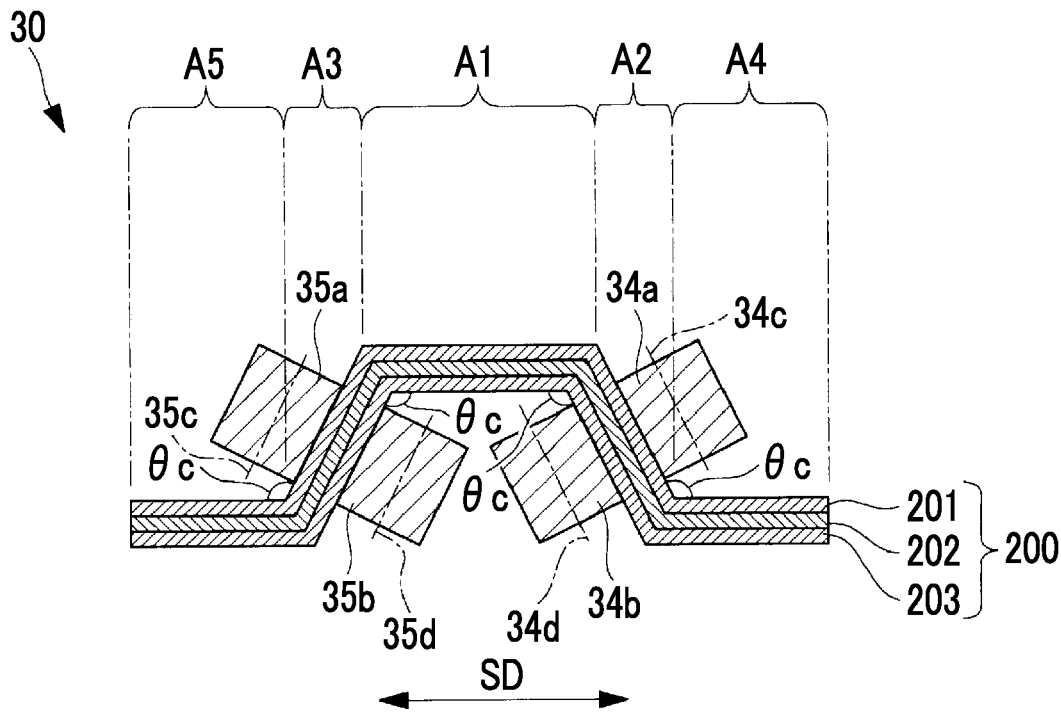
FIG. 7 is a cross-sectional view taken along line V-V which shows the shaping device shown in FIG. 2 as seen along arrows.
Figure 8:
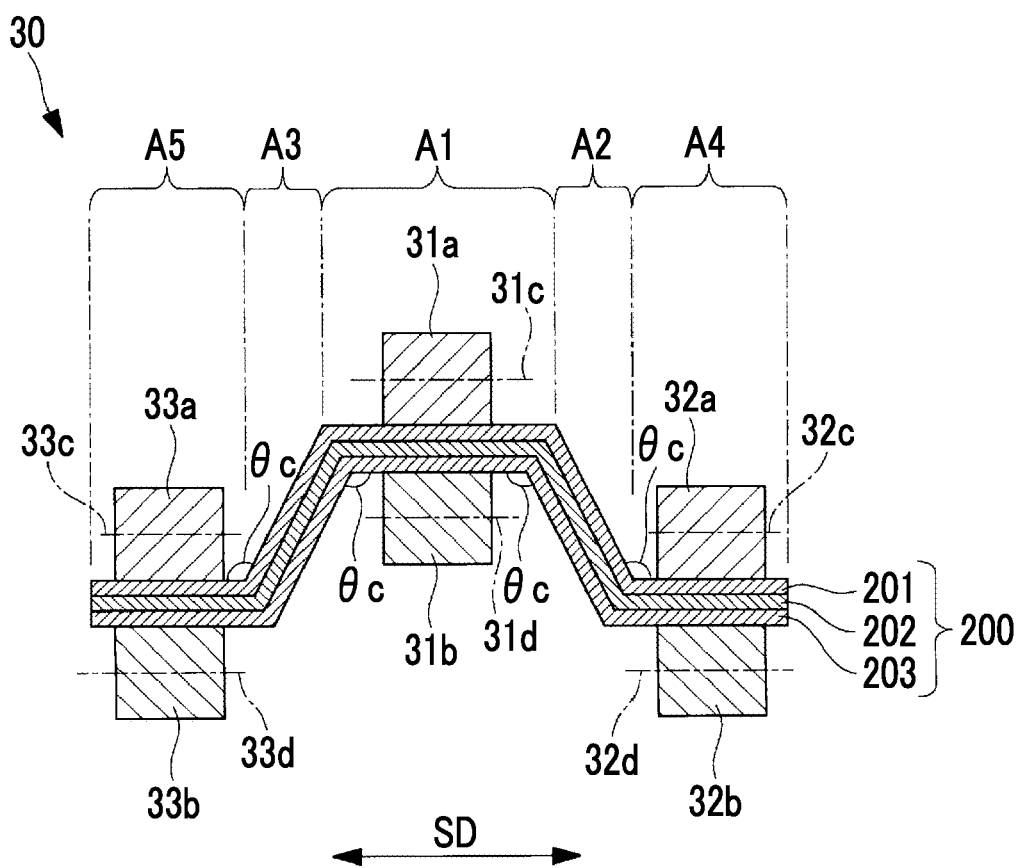
FIG. 8 is a cross-sectional view taken along line VI-VI which shows the shaping device shown in FIG. 2 as seen along arrows.

Hereinafter, a shaping device 100 according to a first embodiment of the present disclosure and a method of shaping a laminate 200 in which the shaping device 100 is used will be described with reference to the drawings. FIG. 1 is a perspective view showing the shaping device 100 according to the first embodiment of the present disclosure. FIG. 2 is a side view showing the shaping device 100 shown in FIG. 1 as seen in a lateral direction of the laminate 200. FIG. 3 is a cross-sectional view taken along line I-I which shows the shaping device 100 shown in FIG. 2 as seen along arrows. FIG. 4 is a cross-sectional view taken along line II-II which shows the shaping device 100 shown in FIG. 2 as seen along arrows. FIG. 5 is a cross-sectional view taken along line III-III which shows the shaping device 100 shown in FIG. 2 as seen along arrows. FIG. 6 is a cross-sectional view taken along line IV-IV which shows the shaping device 100 shown in FIG. 2 as seen along arrows. FIG. 7 is a cross-sectional view taken along line V-V which shows the shaping device 100 shown in FIG. 2 as seen along arrows. FIG. 8 is a cross-sectional view taken along line VI-VI which shows the shaping device 100 shown in FIG. 2 as seen along arrows.

The shaping device 100 of the present embodiment is a device that shapes the laminate 200, which is formed in a flat shape by laminating three sheet-shaped composite materials 201, 202, and 203, into a desired shape with a plurality of bent portions. The composite materials 201, 202, and 203 are sheet-shaped intermediate molding materials in which fiber base materials and matrix resins (resin materials) attached thereto are semi-integrated with each other. The laminate 200 is used as a structure for a fuselage portion or the like of an aircraft by being solidified after being shaped into a desired shape. In the present embodiment, the laminate 200 in which the three composite materials 201, 202, and 203 are laminated is used. However, the laminate 200 in which the number of laminated composite materials is any number equal to or greater than two may also be used.

The fiber base materials included in the composite materials 201, 202, and 203 are, for example, carbon fibers, glass fibers, aramid fibers, or the like. In addition, as the matrix resins included in the composite materials 201, 202, and 203, any of thermoplastic resin materials and thermosetting resin materials can be used. Examples of the thermoplastic resin materials include polyetheretherketone (PEEK), polyethylene terephthalate (PET), polybutylene terephthalate (PBT), nylon 6 (PA6), nylon 66 (PA66), polyphenylene sulfide (PPS), polyetherimide (PEI), and polyetherketoneketone (PEKK).

As shown in FIG. 1, the laminate 200 shaped by the shaping device 100 is formed in a long shape of which the length in a longitudinal direction LD is large and the length in a lateral direction SD is small. The shaping device 100 shapes the laminate 200 into a shape obtained by mountain-folding the laminate 200 along mountain fold lines 204 and 205 (fold lines) extending along the longitudinal direction LD of the laminate 200 and shapes the laminate 200 into a shape obtained by valley-folding the laminate 200 along valley fold lines (fold lines) 206 and 207 extending along the longitudinal direction LD of the laminate 200.

As shown in FIG. 1, the laminate 200 is divided by the mountain fold line 204, the mountain fold line 205, the valley fold line 206, and the valley fold line 207 and includes a first region A1, a second region A2, a third region A3, a fourth region A4, and a fifth region A5 each of which extends in the longitudinal direction LD. The first region A1 is a region between the mountain fold line 204 and the mountain fold line 205. The second region A2 is a region between the mountain fold line 204 and the valley fold line 206. The third region A3 is a region between the mountain fold line 205 and the valley fold line 207. The fourth region A4 is a region adjacent to the second region A2 with the valley fold line 206 interposed therebetween. The fifth region A5 is a region adjacent to the third region A3 with the valley fold line 207 interposed therebetween.

As shown in FIGS. 1 and 2, the shaping device 100 includes an upstream side shaping unit 10, an intermediate shaping unit (a first shaping unit) 20, and a downstream side shaping unit (a second shaping unit) 30 in order from an upstream side in a transport direction TD along the longitudinal direction LD of the laminate 200. The shaping device 100 transports the laminate 200 along the transport direction TD from the upstream side to a downstream side in the transport direction TD and continuously shapes each position on the laminate 200 in the longitudinal direction LD by means of the upstream side shaping unit 10, the intermediate shaping unit (the first shaping unit) 20, and the downstream side shaping unit (the second shaping unit) 30.

In the shaping device 100 of the present embodiment, the three shaping units are provided in order from the upstream side in the transport direction TD of the laminate 200. However, another configuration may also be adopted. For example, the number of shaping units provided in order from the upstream side in the transport direction TD of the laminate 200 may be any number equal to or greater than two.

The upstream side shaping unit 10 includes a pair of cooling rollers 11a and 11b, a pair of cooling rollers 12a and 12b, a pair of cooling rollers 13a and 13b, a pair of heating rollers 14a and 14b, and a pair of heating rollers 15a and 15b. As shown in FIG. 4, the pair of cooling rollers 11a and 11b is disposed such that the cooling rollers 11a and 11b face each other with the first region A1 of the laminate 200 interposed therebetween at a position P2 (refer to FIG. 2) in the transport direction TD of the laminate 200. The pair of cooling rollers 11a and 11b rotates around axes 11c and 11d, each of which extends in parallel with the lateral direction SD, in a direction for transporting the laminate 200 in the transport direction TD.

The pair of cooling rollers 12a and 12b is disposed such that the cooling rollers 12a and 12b face each other with the fourth region A4 of the laminate 200 interposed therebetween at the position P2 in the transport direction TD of the laminate 200. The pair of cooling rollers 12a and 12b rotates around axes 12c and 12d, each of which extends in parallel with the lateral direction SD, in a direction for transporting the laminate 200 in the transport direction TD.

The pair of cooling rollers 13a and 13b is disposed such that the cooling rollers 13a and 13b face each other with the fifth region A5 of the laminate 200 interposed therebetween at the position P2 in the transport direction TD of the laminate 200. The pair of cooling rollers 13a and 13b rotates around axes 13c and 13d, each of which extends in parallel with the lateral direction SD, in a direction for transporting the laminate 200 in the transport direction TD.

As shown in FIG. 3, the pair of heating rollers 14a and 14b is disposed such that the heating rollers 14a and 14b face each other with the second region A2 of the laminate 200 interposed therebetween at a position P1 (refer to FIG. 2) in the transport direction TD of the laminate 200. The pair of heating rollers 14a and 14b rotates around axes 14c and 14d, each of which extends in a direction that is orthogonal to the transport direction TD and is inclined with respect to the lateral direction SD, in a direction for transporting the laminate 200 in the transport direction TD.

The pair of heating rollers 15a and 15b is disposed such that the heating rollers 15a and 15b face each other with the third region A3 of the laminate 200 interposed therebetween at the position P1 in the transport direction TD of the laminate 200. The pair of heating rollers 15a and 15b rotates around axes 15c and 15d, each of which extends in a direction that is orthogonal to the transport direction TD and is inclined with respect to the lateral direction SD, in a direction for transporting the laminate 200 in the transport direction TD.

The upstream side shaping unit 10 maintains the first region A1 of the laminate 200 in a state of being parallel with a horizontal direction by means of the pair of cooling rollers 11a and 11b and maintains the second region A2 of the laminate 200 in a state of being inclined with respect to the horizontal direction by means of the pair of heating rollers 14a and 14b. The upstream side shaping unit 10 shapes the laminate 200 along the mountain fold line 204 such that a bending angle θa is formed between the first region A1 and the second region A2 which are disposed with the mountain fold line 204 interposed therebetween.

The upstream side shaping unit 10 maintains the fourth region A4 of the laminate 200 in a state of being parallel with the horizontal direction by means of the pair of cooling rollers 12a and 12b and maintains the second region A2 of the laminate 200 in a state of being inclined with respect to the horizontal direction by means of the pair of heating rollers 14a and 14b. The upstream side shaping unit 10 shapes the laminate 200 along the valley fold line 206 such that the bending angle θa is formed between the second region A2 and the fourth region A4 which are disposed with the valley fold line 206 interposed therebetween.

The upstream side shaping unit 10 maintains the first region A1 of the laminate 200 in a state of being parallel with the horizontal direction by means of the pair of cooling rollers 11a and 11b and maintains the third region A3 of the laminate 200 in a state of being inclined with respect to the horizontal direction by means of the pair of heating rollers 15a and 15b. The upstream side shaping unit 10 shapes the laminate 200 along the mountain fold line 205 such that the bending angle θa is formed between the first region A1 and the third region A3 which are disposed with the mountain fold line 205 interposed therebetween.

The upstream side shaping unit 10 maintains the fifth region A5 of the laminate 200 in a state of being parallel with the horizontal direction by means of the pair of cooling rollers 13a and 13b and maintains the third region A3 of the laminate 200 in a state of being inclined with respect to the horizontal direction by means of the pair of heating rollers 15a and 15b. The upstream side shaping unit 10 shapes the laminate 200 along the valley fold line 207 such that the bending angle θa is formed between the third region A3 and the fifth region A5 which are disposed with the valley fold line 207 interposed therebetween.

The intermediate shaping unit 20 includes a pair of cooling rollers (first cooling rollers) 21a and 21b, a pair of cooling rollers 22a and 22b, a pair of cooling rollers 23a and 23b, a pair of heating rollers (first heating rollers) 24a and 24b, and a pair of heating rollers 25a and 25b. As shown in FIG. 6, the pair of cooling rollers 21a and 21b is disposed such that the cooling rollers 21a and 21b face each other with the first region A1 of the laminate 200 interposed therebetween at a position P4 (refer to FIG. 2) in the transport direction TD of the laminate 200. The pair of cooling rollers 21a and 21b rotates around axes 21c and 21d, each of which extends in parallel with the lateral direction SD, in a direction for transporting the laminate 200 in the transport direction TD.

The pair of cooling rollers 22a and 22b is disposed such that the cooling rollers 22a and 22b face each other with the fourth region A4 of the laminate 200 interposed therebetween at the position P4 in the transport direction TD of the laminate 200. The pair of cooling rollers 22a and 22b rotates around axes 22c and 22d, each of which extends in parallel with the lateral direction SD, in a direction for transporting the laminate 200 in the transport direction TD.

The pair of cooling rollers 23a and 23b is disposed such that the cooling rollers 23a and 23b face each other with the fifth region A5 of the laminate 200 interposed therebetween at the position P4 in the transport direction TD of the laminate 200. The pair of cooling rollers 23a and 23b rotates around axes 23c and 23d, each of which extends in parallel with the lateral direction SD, in a direction for transporting the laminate 200 in the transport direction TD.

As shown in FIG. 5, the pair of heating rollers 24a and 24b is disposed such that the heating rollers 24a and 24b face each other with the second region A2 of the laminate 200 interposed therebetween at a position P3 (refer to FIG. 2) in the transport direction TD of the laminate 200. The pair of heating rollers 24a and 24b rotates around axes 24c and 24d, each of which extends in a direction that is orthogonal to the transport direction TD and is inclined with respect to the lateral direction SD, in a direction for transporting the laminate 200 in the transport direction TD.

The pair of heating rollers 25a and 25b is disposed such that the heating rollers 25a and 25b face each other with the third region A3 of the laminate 200 interposed therebetween at the position P3 in the transport direction TD of the laminate 200. The pair of heating rollers 25a and 25b rotates around axes 25c and 25d, each of which extends in a direction that is orthogonal to the transport direction TD and is inclined with respect to the lateral direction SD, in a direction for transporting the laminate 200 in the transport direction TD.

The intermediate shaping unit 20 maintains the first region A1 of the laminate 200 in a state of being parallel with the horizontal direction by means of the pair of cooling rollers 21a and 21b and maintains the second region A2 of the laminate 200 in a state of being inclined with respect to the horizontal direction by means of the pair of heating rollers 24a and 24b. The intermediate shaping unit 20 shapes the laminate 200 along the mountain fold line 204 such that a bending angle (a first bending angle) θb is formed between the first region A1 and the second region A2 which are disposed with the mountain fold line 204 interposed therebetween. The bending angle θb is smaller than the bending angle θa.

The intermediate shaping unit 20 maintains the fourth region A4 of the laminate 200 in a state of being parallel with the horizontal direction by means of the pair of cooling rollers 22a and 22b and maintains the second region A2 of the laminate 200 in a state of being inclined with respect to the horizontal direction by means of the pair of heating rollers 24a and 24b. The intermediate shaping unit 20 shapes the laminate 200 along the valley fold line 206 such that the bending angle θb is formed between the second region A2 and the fourth region A4 which are disposed with the valley fold line 206 interposed therebetween.

The intermediate shaping unit 20 maintains the first region A1 of the laminate 200 in a state of being parallel with the horizontal direction by means of the pair of cooling rollers 21a and 21b and maintains the third region A3 of the laminate 200 in a state of being inclined with respect to the horizontal direction by means of the pair of heating rollers 25a and 25b. The intermediate shaping unit 20 shapes the laminate 200 along the mountain fold line 205 such that the bending angle θb is formed between the first region A1 and the third region A3 which are disposed with the mountain fold line 205 interposed therebetween.

The intermediate shaping unit 20 maintains the fifth region A5 of the laminate 200 in a state of being parallel with the horizontal direction by means of the pair of cooling rollers 23a and 23b and maintains the third region A3 of the laminate 200 in a state of being inclined with respect to the horizontal direction by means of the pair of heating rollers 25a and 25b. The intermediate shaping unit 20 shapes the laminate 200 along the valley fold line 207 such that the bending angle θb is formed between the third region A3 and the fifth region A5 which are disposed with the valley fold line 207 interposed therebetween.

The downstream side shaping unit 30 includes a pair of cooling rollers (second cooling rollers) 31a and 31b, a pair of cooling rollers 32a and 32b, a pair of cooling rollers 33a and 33b, a pair of heating rollers (second heating rollers) 34a and 34b, and a pair of heating rollers 35a and 35b. As shown in FIG. 8, the pair of cooling rollers 31a and 31b is disposed such that the cooling rollers 31a and 31b face each other with the first region A1 of the laminate 200 interposed therebetween at a position P6 (refer to FIG. 2) in the transport direction TD of the laminate 200. The pair of cooling rollers 31a and 31b rotates around axes 31c and 31d, each of which extends in parallel with the lateral direction SD, in a direction for transporting the laminate 200 in the transport direction TD.

The pair of cooling rollers 32a and 32b is disposed such that the cooling rollers 32a and 32b face each other with the fourth region A4 of the laminate 200 interposed therebetween at the position P6 in the transport direction TD of the laminate 200. The pair of cooling rollers 32a and 32b rotates around axes 32c and 32d, each of which extends in parallel with the lateral direction SD, in a direction for transporting the laminate 200 in the transport direction TD.

The pair of cooling rollers 33a and 33b is disposed such that the cooling rollers 33a and 33b face each other with the fifth region A5 of the laminate 200 interposed therebetween at the position P6 in the transport direction TD of the laminate 200. The pair of cooling rollers 33a and 33b rotates around axes 33c and 33d, each of which extends in parallel with the lateral direction SD, in a direction for transporting the laminate 200 in the transport direction TD.

As shown in FIG. 7, the pair of heating rollers 34a and 34b is disposed such that the heating rollers 34a and 34b face each other with the second region A2 of the laminate 200 interposed therebetween at a position P5 (refer to FIG. 2) in the transport direction TD of the laminate 200. The pair of heating rollers 34a and 34b rotates around axes 34c and 34d, each of which extends in a direction that is orthogonal to the transport direction TD and is inclined with respect to the lateral direction SD, in a direction for transporting the laminate 200 in the transport direction TD.

The pair of heating rollers 35a and 35b is disposed such that the heating rollers 35a and 35b face each other with the third region A3 of the laminate 200 interposed therebetween at the position P5 in the transport direction TD of the laminate 200. The pair of heating rollers 35a and 35b rotates around axes 35c and 35d, each of which extends in a direction that is orthogonal to the transport direction TD and is inclined with respect to the lateral direction SD, in a direction for transporting the laminate 200 in the transport direction TD.

The downstream side shaping unit 30 maintains the first region A1 of the laminate 200 in a state of being parallel with the horizontal direction by means of the pair of cooling rollers 31a and 31b and maintains the second region A2 of the laminate 200 in a state of being inclined with respect to the horizontal direction by means of the pair of heating rollers 34a and 34b. The downstream side shaping unit 30 shapes the laminate 200 along the mountain fold line 204 such that a bending angle (a second bending angle) θc is formed between the first region A1 and the second region A2 which are disposed with the mountain fold line 204 interposed therebetween. The bending angle θc is smaller than the bending angle θb.

The downstream side shaping unit 30 maintains the fourth region A4 of the laminate 200 in a state of being parallel with the horizontal direction by means of the pair of cooling rollers 32a and 32b and maintains the second region A2 of the laminate 200 in a state of being inclined with respect to the horizontal direction by means of the pair of heating rollers 34a and 34b. The downstream side shaping unit 30 shapes the laminate 200 along the valley fold line 206 such that the bending angle θc is formed between the second region A2 and the fourth region A4 which are disposed with the valley fold line 206 interposed therebetween.

The downstream side shaping unit 30 maintains the first region A1 of the laminate 200 in a state of being parallel with the horizontal direction by means of the pair of cooling rollers 31a and 31b and maintains the third region A3 of the laminate 200 in a state of being inclined with respect to the horizontal direction by means of the pair of heating rollers 35a and 35b. The downstream side shaping unit 30 shapes the laminate 200 along the mountain fold line 205 such that the bending angle θc is formed between the first region A1 and the third region A3 which are disposed with the mountain fold line 205 interposed therebetween.

The downstream side shaping unit 30 maintains the fifth region A5 of the laminate 200 in a state of being parallel with the horizontal direction by means of the pair of cooling rollers 33a and 33b and maintains the third region A3 of the laminate 200 in a state of being inclined with respect to the horizontal direction by means of the pair of heating rollers 35a and 35b. The downstream side shaping unit 30 shapes the laminate 200 along the valley fold line 207 such that the bending angle θb is formed between the third region A3 and the fifth region A5 which are disposed with the valley fold line 207 interposed therebetween.

In each of the heating rollers 14a, 14b, 15a, and 15b of the upstream side shaping unit 10, the heating rollers 24a, 24b, 25a, and 25b of the intermediate shaping unit 20, and the heating rollers 34a, 34b, 35a, and 35b of the downstream side shaping unit 30, a heating mechanism that increases the temperature of a roller surface to a temperature equal to or higher than the softening point of the matrix resins included in the composite materials constituting the laminate 200 is installed. The heating mechanism is a mechanism that circulates liquid (water, oil, or the like) heated by an external heating source or is an electric heater, for example.

Here, in a case where thermoplastic resin materials are used as the matrix resins, the softening point of the matrix resins is a temperature that falls within a predetermined range including the melting point of the thermoplastic resin materials. For example, the softening point of the matrix resins is a temperature that falls within a range from Tm−30° C. or higher to Tm+30° C. or lower, where Tm is the melting point of the thermoplastic resin materials.

In addition, in a case where thermosetting resin materials are used as the matrix resins, the softening point of the matrix resins is a temperature that falls within a range from a temperature, at which the thermosetting resin materials are softened due to heat and are deformed without being broken even if an external force is applied thereto, to a temperature, at which curing reaction of the thermosetting resin materials starts. For example, in a case where representative epoxy resins that are used for an aircraft component is used as the thermosetting resin materials, the softening point of the matrix resins is a temperature that falls within a range from 50° C. to 90° C.

In each of the cooling rollers 11a, 11b, 12a, 12b, 13a, and 13b of the upstream side shaping unit 10, the cooling rollers 21a, 21b, 22a, 22b, 23a, and 23b of the intermediate shaping unit 20, and the cooling rollers 31a, 31b, 32a, 32b, 33a, and 33b of the downstream side shaping unit 30, a cooling mechanism that maintains the temperature of a roller surface at a temperature lower than the softening point of the matrix resins included in the composite materials constituting the laminate 200 is installed.

The cooling mechanism is, for example, a mechanism or the like that circulates liquid (water, oil, or the like) of which the temperature is maintained at a temperature lower than the softening point of the matrix resins by an external cooling source. In addition, as the cooling mechanism, a mechanism that maintains the temperatures of the matrix resins at temperatures lower than the softening point by means of a roller having a heat capacity higher than that of a heating roller disposed close thereto may be adopted instead of a mechanism that actively maintains a temperature at a temperature lower than the softening point by means of liquid or the like.

For example, heating rollers disposed close to the cooling roller 11a are the heating rollers 14a and 14b and a heating roller disposed close to the cooling roller 12a is the heating roller 14a. The material of a cooling roller and the material of a heating roller may be different from each other so that the heat capacity of the cooling roller is made higher than that of the heating roller disposed close to the cooling roller.

For example, in a case where the heating roller is formed of a metallic material, the cooling roller may be formed of a material (ceramics or the like) having a specific heat higher than that of the metallic material. In addition, the size of the cooling roller may be larger than that of the heating roller so that the heat capacity of the cooling roller is made higher than that of the heating roller disposed close to the cooling roller. For example, in a case where the cooling roller and the heating roller are formed of the same material (a metallic material or the like) and the size the cooling roller is larger than that of the heating roller, the heat capacity of the cooling roller is higher than the heat capacity of the heating roller.

Figure 9:
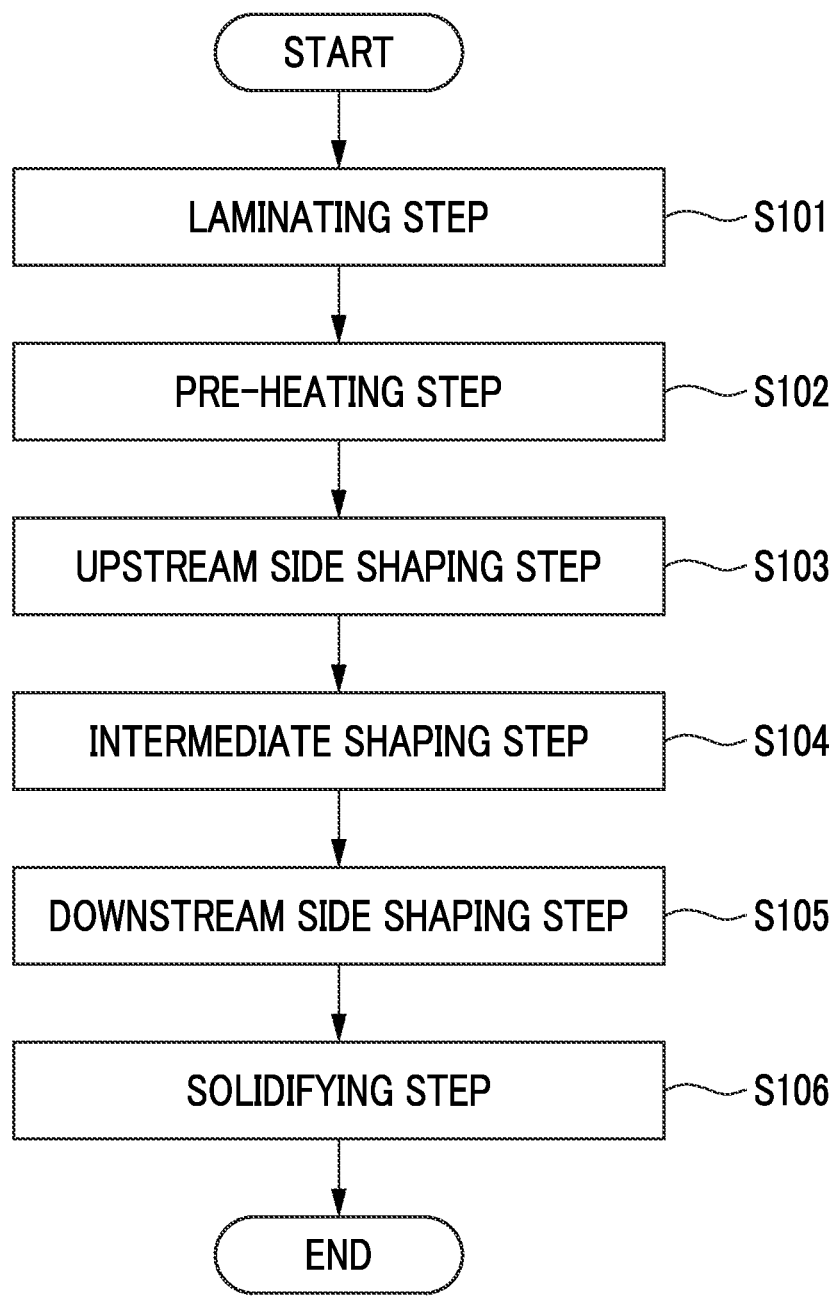
FIG. 9 is a flowchart showing a shaping method according to the first embodiment of the present disclosure.
Figure 10:
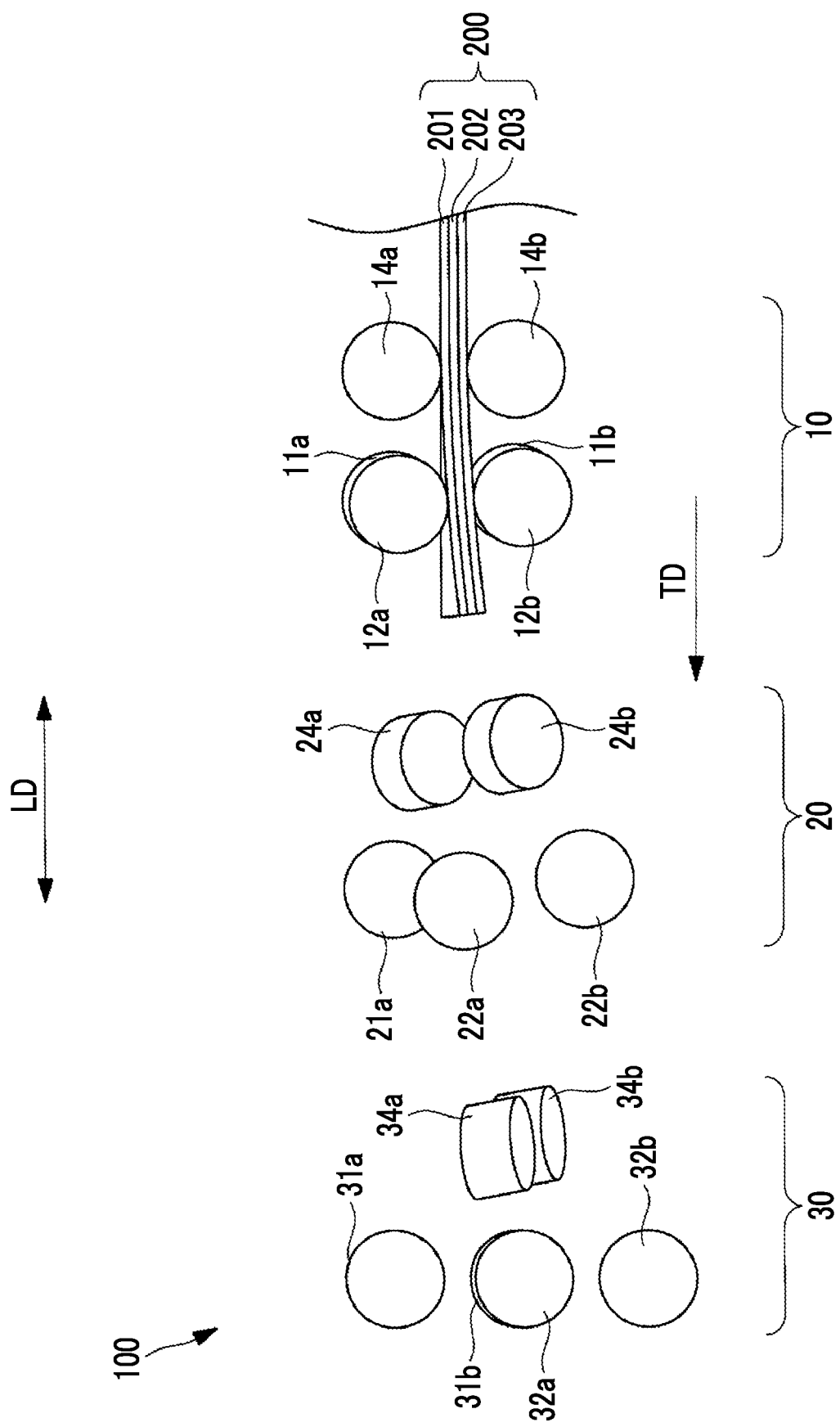
FIG. 10 is a side view showing the shaping device shown in FIG. 1 as seen in the lateral direction of the laminate and shows a state where a leading edge region of the laminate in a transport direction is shaped by a first shaping unit.
Figure 11:
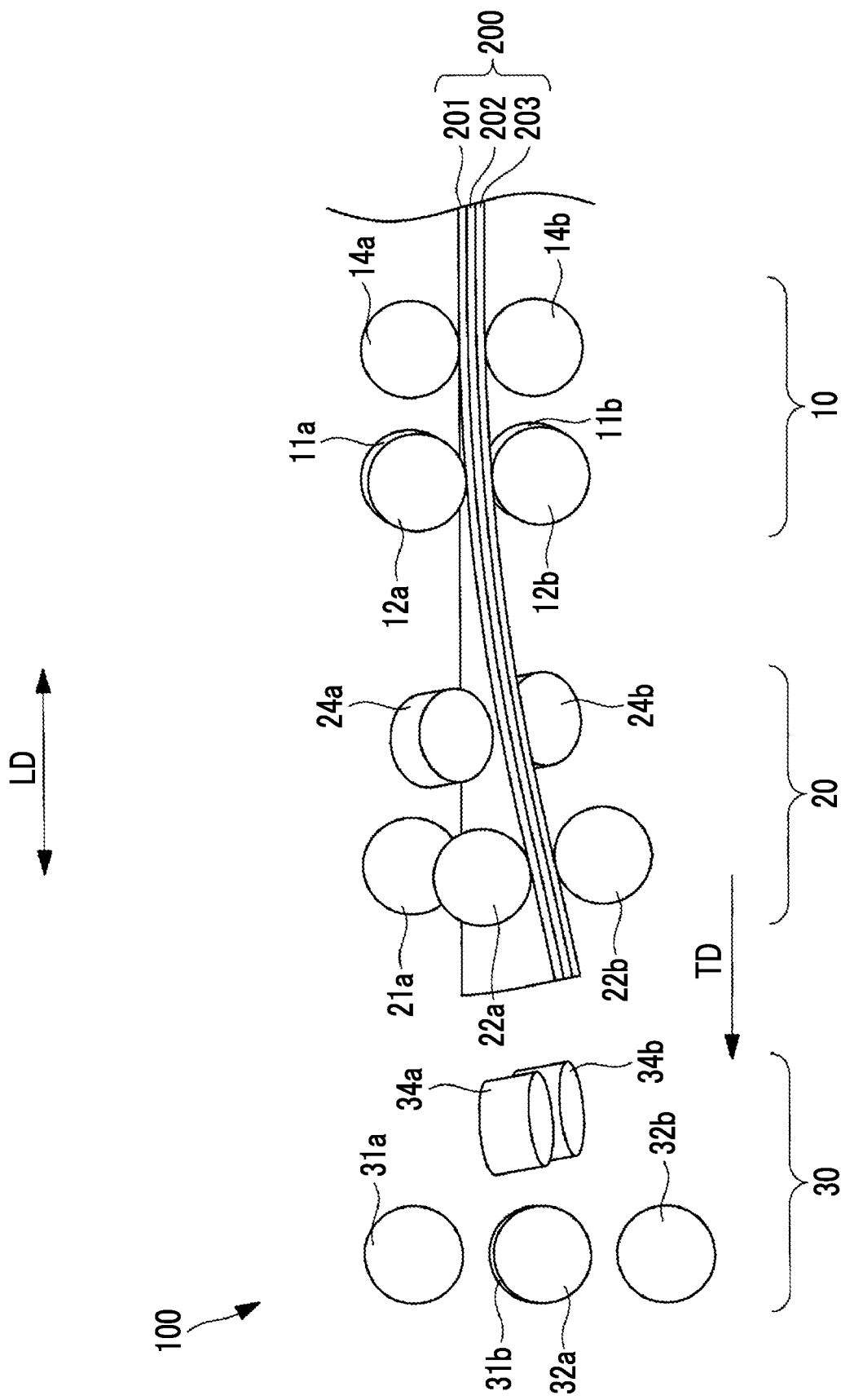
FIG. 11 is a side view showing the shaping device shown in FIG. 1 as seen in the lateral direction of the laminate and shows a state where the leading edge region of the laminate in the transport direction is shaped by a second shaping unit.
Figure 12:
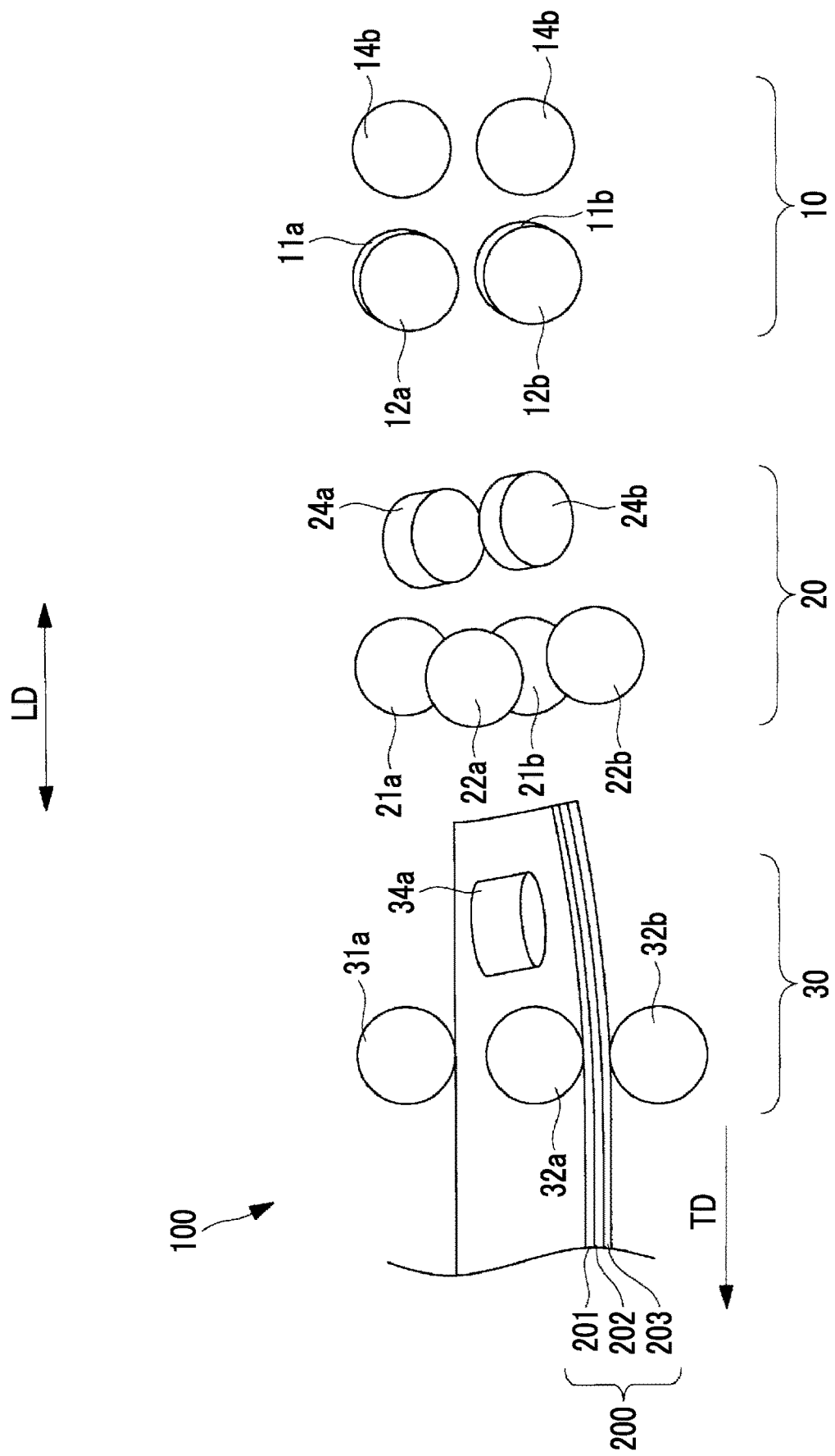
FIG. 12 is a side view showing the shaping device shown in FIG. 1 as seen in the lateral direction of the laminate and shows a state where a following edge region of the laminate in the transport direction is shaped by a third shaping unit.

Next, a shaping method according to the present embodiment will be described with reference to FIG. 2 and FIGS. 9 to 12. FIG. 9 is a flowchart showing the shaping method according to the first embodiment of the present disclosure. FIG. 2 and FIGS. 10 to 12 are side views showing the shaping device 100 shown in FIG. 1 as seen in the lateral direction SD of the laminate 200. FIG. 10 shows a state where a leading edge region of the laminate 200 in the transport direction TD is shaped by the upstream side shaping unit 10. FIG. 11 shows a state where a leading edge region of the laminate 200 in the transport direction TD is shaped by the intermediate shaping unit 20. FIG. 2 shows a state where a leading edge region of the laminate 200 in the transport direction TD is shaped by the downstream side shaping unit 30. FIG. 12 shows a state where a following edge region of the laminate 200 in the transport direction TD is shaped by the downstream side shaping unit 30.

In step S101 of FIG. 9, the three sheet-shaped composite materials 201, 202, and 203 are laminated on a flat installation surface (not shown) to form the laminate 200 in a flat shape.

In step S102, pre-heating is performed to increase the temperature of the laminate 200 in the flat shape to a predetermined temperature lower than the softening point of the matrix resins included in the composite materials constituting the laminate 200. A pre-heating step is performed, for example, by installing the laminate 200 in a space, of which the temperature is maintained at a predetermined temperature, for a certain period of time. The pre-heating step may be omitted without being performed.

In step S103, an upstream side shaping step is performed by the upstream side shaping unit 10. In the upstream side shaping step, the upstream side shaping unit 10 shapes the laminate 200 along the mountain fold lines 204 and 205 and the valley fold lines 206 and 207 such that the bending angle θa is formed between the first region A1 and the second region A2, between the second region A2 and the fourth region A4, between the first region A1 and the third region A3, and between the third region A3 and the fifth region A5.

In step S104, an intermediate shaping step (a first shaping step) is performed by the intermediate shaping unit 20. In the intermediate shaping step, the intermediate shaping unit 20 shapes the laminate 200 along the mountain fold lines 204 and 205 and the valley fold lines 206 and 207 such that the bending angle θb is formed between the first region A1 and the second region A2, between the second region A2 and the fourth region A4, between the first region A1 and the third region A3, and between the third region A3 and the fifth region A5.

In step S105, a downstream side shaping step (a second shaping step) is performed by the downstream side shaping unit 30. In the downstream side shaping step, the downstream side shaping unit 30 shapes the laminate 200 along the mountain fold lines 204 and 205 and the valley fold lines 206 and 207 such that the bending angle θc is formed between the first region A1 and the second region A2, between the second region A2 and the fourth region A4, between the first region A1 and the third region A3, and between the third region A3 and the fifth region A5.

Here, each of step S103, step S104, and step S105 is continuously performed with respect to each position in the longitudinal direction LD of the laminate 200. As shown in FIG. 10, the laminate 200 in a flat plate-like shape is supplied to the upstream side shaping unit 10 such that the leading edge region disposed on a leading edge side in the transport direction TD is supplied thereto first. The upstream side shaping unit 10 applies a transport force to the laminate 200 in the transport direction TD by means of each roller and supplies the leading edge region of the laminate 200 to the intermediate shaping unit 20 while shaping the laminate 200.

As shown in FIG. 11, the leading edge region of the laminate 200 shaped by the upstream side shaping unit 10 is supplied to the intermediate shaping unit 20. The intermediate shaping unit 20 applies a transport force to the laminate 200 in the transport direction TD by means of each roller and supplies the leading edge region of the laminate 200 to the downstream side shaping unit 30 while shaping the laminate 200.

As shown in FIG. 2, the leading edge region of the laminate 200 shaped by the intermediate shaping unit 20 is supplied to the downstream side shaping unit 30. The downstream side shaping unit 30 applies a transport force to the laminate 200 in the transport direction TD by means of each roller and supplies the leading edge region of the laminate 200 to the downstream side in the transport direction TD while shaping the laminate 200.

In the upstream side shaping step, the intermediate shaping step, and the downstream side shaping step, as described above, transportation to the downstream side in the transport direction TD is performed with the leading edge region of the laminate 200 being shaped continuously in this order: the upstream side shaping unit 10, the intermediate shaping unit 20, and the downstream side shaping unit 30. In the upstream side shaping step, the intermediate shaping step, and the downstream side shaping step, as with the leading edge region of the laminate 200, transportation to the downstream side in the transport direction TD is performed with each position in the longitudinal direction of the laminate 200 being shaped continuously in this order: the upstream side shaping unit 10, the intermediate shaping unit 20, and the downstream side shaping unit 30.

As shown in FIG. 12, a series of shaping steps is finished when the following edge region of the laminate 200 in the longitudinal direction is transported to the downstream side in the transport direction TD after being shaped by the downstream side shaping unit 30. When the series of shaping steps is finished and the laminate 200 in the flat shape is shaped into a desired shape, a solidifying step of solidifying the laminate 200 is performed thereafter.

In step S106, a solidifying step of solidifying the laminate 200 shaped into the desired shape is performed. In a case where the matrix resins included in the composite materials constituting the laminate 200 are thermoplastic resins, a solidifying step of cooling the laminate 200 to a temperature lower than the softening point thereof to densify the laminate 200 is performed. In a case where the matrix resins included in the composite materials constituting the laminate 200 are thermosetting resins, a solidifying step of heating the laminate 200 to a temperature equal to or higher than a curing temperature, at which the matrix resins are cured, to cure the matrix resins is performed.

In the present embodiment, the shaping device 100 is fixed so as not to move and a transport force is applied to the laminate 200 by means of the upstream side shaping unit 10, the intermediate shaping unit 20, and the downstream side shaping unit 30 so that the laminate 200 is moved in the transport direction TD. However, another embodiment in which the laminate 200 is fixed so as not to move and the shaping device 100 shapes the laminate 200 with the shaping device 100 being moved along the longitudinal direction LD of the laminate 200 may also be adopted. That is, there is no limitation on the upstream side shaping step S103, the intermediate shaping step S104, and the downstream side shaping step S105 as long as the laminate 200 is moved relative to the shaping device 100 in the longitudinal direction LD.

Second Embodiment

Figure 13:
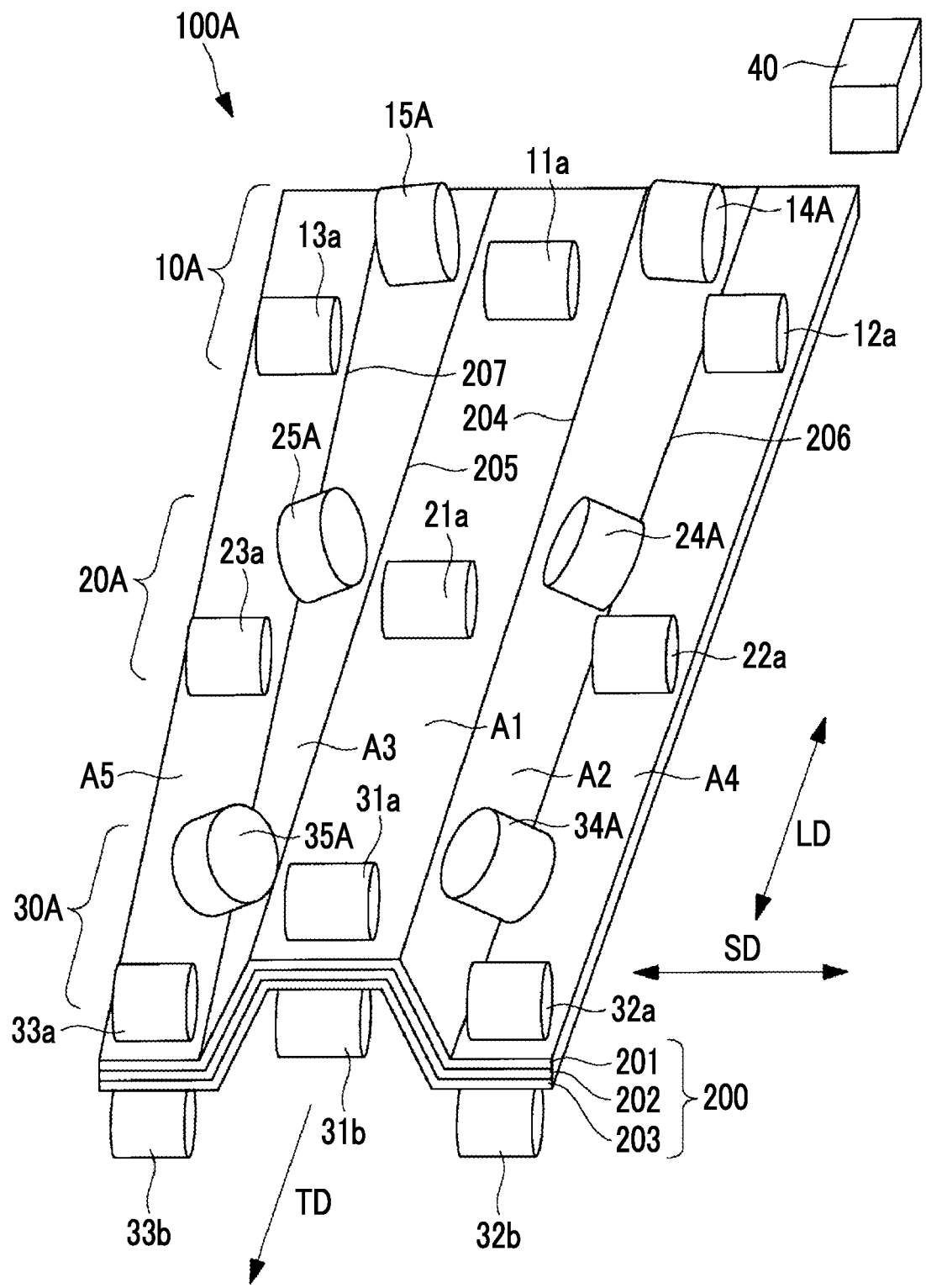
FIG. 13 is a perspective view showing a shaping device according to a second embodiment of the present disclosure.

Next, a shaping device 100A according to a second embodiment of the present disclosure and a method of shaping the laminate 200 in which the shaping device 100A is used will be described with reference to the drawings. FIG. 13 is a perspective view showing the shaping device 100A according to the second embodiment of the present disclosure. The present embodiment is a modification example of the first embodiment, is the same as the first embodiment except for a case particularly described below, and the description thereof will be omitted below.

In the first embodiment, the second region A2 of the laminate 200 is heated by means of the pair of heating rollers 14a and 14b of the upstream side shaping unit 10, the pair of heating rollers 24a and 24b of the intermediate shaping unit 20, and the pair of heating rollers 34a and 34b of the downstream side shaping unit 30 and the third region A3 of the laminate 200 is heated by means of the pair of heating rollers 15a and 15b of the upstream side shaping unit 10, the pair of heating rollers 25a and 25b of the intermediate shaping unit 20, and the pair of heating rollers 35a and 35b of the downstream side shaping unit 30. On the other hand, in the present embodiment, the second region A2 and the third region A3 of the laminate 200 are heated by heating the matrix resins to a temperature equal to or higher than the softening point by means of heat transmission from a space in which the laminate 200 is disposed.

The shaping device 100A of the present embodiment includes a heating device 40 that heats a space, in which the laminate 200 is disposed, to a temperature equal to or higher than the softening point of the matrix resins included in the composite materials constituting the laminate 200. At the time of the upstream side shaping step, the intermediate shaping step, and the downstream side shaping step shown in FIG. 9, the heating device 40 heats the space in which the laminate 200 is disposed such that the temperatures of the matrix resins become equal to or higher than the softening point at the second region A2 and the third region A3 of the laminate 200 due to heat transmission from the space (a heating step). The heating device 40 heats the space by sucking a gas present in the space in which the laminate 200 is disposed and discharging the gas heated by a heating source (not shown) into the space, for example.

As shown in FIG. 13, a pair of shaping rollers 14A (the back surface side of the laminate 200 is not shown) is provided instead of the pair of heating rollers 14a and 14b of the upstream side shaping unit 10 of the first embodiment. In addition, a pair of shaping rollers 15A (the back surface side of the laminate 200 is not shown) is provided instead of the pair of heating rollers 15a and 15b of the upstream side shaping unit 10 of the first embodiment.

The pair of shaping rollers 14A is disposed at the same position as the pair of heating rollers 14a and 14b of the first embodiment and has the same shape as the pair of heating rollers 14a and 14b. However, the pair of shaping rollers 14A is different from the pair of heating rollers 14a and 14b in that no heating mechanism is provided therein. In the present embodiment, since the matrix resins are heated to a temperature equal to or higher than the softening point due to heat transmission from the space in which the laminate 200 is disposed, it is possible to shape the laminate 200 while promoting interlayer slip deformation at the second region A2 of the laminate 200 by means of the pair of shaping rollers 14A in which no heating mechanism is provided.

In addition, the pair of shaping rollers 15A is disposed at the same position as the pair of heating rollers 15a and 15b of the first embodiment and has the same shape as the pair of heating rollers 15a and 15b. However, the pair of shaping rollers 15A is different from the pair of heating rollers 15a and 15b in that no heating mechanism is provided therein. In the present embodiment, since the matrix resins are heated to a temperature equal to or higher than the softening point due to heat transmission from the space in which the laminate 200 is disposed, it is possible to shape the laminate 200 while promoting interlayer slip deformation at the third region A3 of the laminate 200 by means of the pair of shaping rollers 15A in which no heating mechanism is provided.

In addition, the temperatures of the first region A1, the fourth region A4, and the fifth region A5 are maintained at temperatures lower than the softening point of the matrix resins by means of the pair of cooling rollers 11a and 11b, the pair of cooling rollers 12a and 12b, and the pair of cooling rollers 13a and 13b of the upstream side shaping unit 10. This is because the laminate 200 is cooled by each cooling roller although the matrix resins are heated to a temperature equal to or higher than the softening point due to heat transmission from the space in which the laminate 200 is disposed. Since the temperatures of the matrix resins are maintained at temperatures lower than the softening point at the first region A1, the fourth region A4, and the fifth region A5, it is possible to shape the laminate while suppressing interlayer slip deformation at the first region A1, the fourth region A4, and the fifth region A5.

As shown in FIG. 13, a pair of shaping rollers 24A (the back surface side of the laminate 200 is not shown) is provided instead of the pair of heating rollers 24a and 24b of the intermediate shaping unit 20 of the first embodiment. In addition, a pair of shaping rollers 25A (the back surface side of the laminate 200 is not shown) is provided instead of the pair of heating rollers 25a and 25b of the upstream side shaping unit 10 of the first embodiment.

The pair of shaping rollers 24A is disposed at the same position as the pair of heating rollers 24a and 24b of the first embodiment and has the same shape as the pair of heating rollers 24a and 24b. However, the pair of shaping rollers 24A is different from the pair of heating rollers 24a and 24b in that no heating mechanism is provided therein. In the present embodiment, since the space in which the laminate 200 is disposed is heated to a temperature equal to or higher than the softening point of the matrix resins, it is possible to shape the laminate 200 while promoting interlayer slip deformation at the second region A2 of the laminate 200 by means of the pair of shaping rollers 24A in which no heating mechanism is provided.

In addition, the pair of shaping rollers 25A is disposed at the same position as the pair of heating rollers 25a and 25b of the first embodiment and has the same shape as the pair of heating rollers 25a and 25b. However, the pair of shaping rollers 25A is different from the pair of heating rollers 25a and 25b in that no heating mechanism is provided therein. In the present embodiment, since the space in which the laminate 200 is disposed is heated to a temperature equal to or higher than the softening point of the matrix resins, it is possible to shape the laminate 200 while promoting interlayer slip deformation at the third region A3 of the laminate 200 by means of the pair of shaping rollers 25A in which no heating mechanism is provided.

In addition, the temperatures of the first region A1, the fourth region A4, and the fifth region A5 are maintained at temperatures lower than the softening point of the matrix resins by means of the pair of cooling rollers 21a and 21b, the pair of cooling rollers 22a and 22b, and the pair of cooling rollers 23a and 23b of the intermediate shaping unit 20. This is because the laminate 200 is cooled by each cooling roller although the space in which the laminate 200 is disposed is heated to a temperature equal to or higher than the softening point of the matrix resins.

As shown in FIG. 13, a pair of shaping rollers 34A (the back surface side of the laminate 200 is not shown) is provided instead of the pair of heating rollers 34a and 34b of the downstream side shaping unit 30 of the first embodiment. In addition, a pair of shaping rollers 35A (the back surface side of the laminate 200 is not shown) is provided instead of the pair of heating rollers 35a and 35b of the downstream side shaping unit 30 of the first embodiment.

The pair of shaping rollers 34A is disposed at the same position as the pair of heating rollers 34a and 34b of the first embodiment and has the same shape as the pair of heating rollers 34a and 34b. However, the pair of shaping rollers 34A is different from the pair of heating rollers 34a and 34b in that no heating mechanism is provided therein. In the present embodiment, since the space in which the laminate 200 is disposed is heated to a temperature equal to or higher than the softening point of the matrix resins, it is possible to shape the laminate 200 while promoting interlayer slip deformation at the second region A2 of the laminate 200 by means of the pair of shaping rollers 34A in which no heating mechanism is provided.

In addition, the pair of shaping rollers 35A is disposed at the same position as the pair of heating rollers 35a and 35b of the first embodiment and has the same shape as the pair of heating rollers 35a and 35b. However, the pair of shaping rollers 35A is different from the pair of heating rollers 35a and 35b in that no heating mechanism is provided therein. In the present embodiment, since the space in which the laminate 200 is disposed is heated to a temperature equal to or higher than the softening point of the matrix resins, it is possible to shape the laminate 200 while promoting interlayer slip deformation at the third region A3 of the laminate 200 by means of the pair of shaping rollers 35A in which no heating mechanism is provided.

In addition, the temperatures of the first region A1, the fourth region A4, and the fifth region A5 are maintained at temperatures lower than the softening point of the matrix resins by means of the pair of cooling rollers 31a and 31b, the pair of cooling rollers 32a and 32b, and the pair of cooling rollers 33a and 33b of the downstream side shaping unit 30. This is because the laminate 200 is cooled by each cooling roller although the space in which the laminate 200 is disposed is heated to a temperature equal to or higher than the softening point of the matrix resins.

Third Embodiment

Figure 14:
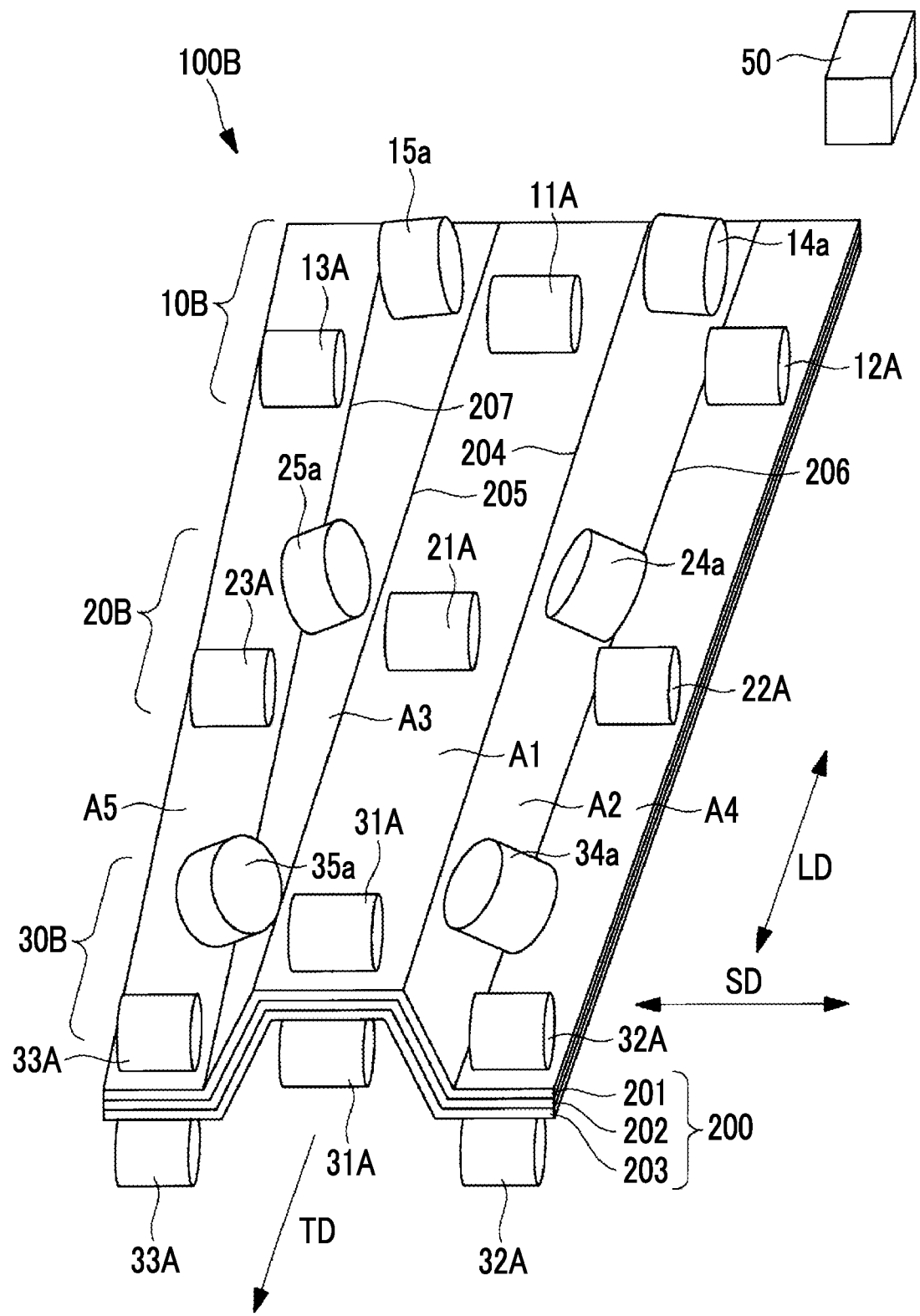
FIG. 14 is a perspective view showing a shaping device according to a third embodiment of the present disclosure.

Next, a shaping device 100B according to a third embodiment of the present disclosure and a method of shaping the laminate 200 in which the shaping device 100B is used will be described with reference to the drawings. FIG. 14 is a perspective view showing the shaping device 100B according to the third embodiment of the present disclosure. The present embodiment is a modification example of the first embodiment, is the same as the first embodiment except for a case particularly described below, and the description thereof will be omitted below.

In the first embodiment, the second region A2 of the laminate 200 is heated by means of the pair of heating rollers 14a and 14b of the upstream side shaping unit 10, the pair of heating rollers 24a and 24b of the intermediate shaping unit 20, and the pair of heating rollers 34a and 34b of the downstream side shaping unit 30 and the third region A3 of the laminate 200 is heated by means of the pair of heating rollers 15a and 15b of the upstream side shaping unit 10, the pair of heating rollers 25a and 25b of the intermediate shaping unit 20, and the pair of heating rollers 35a and 35b of the downstream side shaping unit 30. On the other hand, in the present embodiment, the temperatures of the matrix resins are maintained at temperatures lower than the softening point by means of heat transmission from the space in which the laminate 200 is disposed so that the temperatures of the first region A1, the fourth region A4, and the fifth region A5 of the laminate 200 are maintained at temperatures lower than the softening point of the matrix resins.

The shaping device 100B of the present embodiment includes an air conditioning device 50 that maintains the temperature of a space, in which the laminate 200 is disposed, at a temperature lower than the softening point of the matrix resins included in the composite materials constituting the laminate 200. At the time of the upstream side shaping step, the intermediate shaping step, and the downstream side shaping step shown in FIG. 9, the air conditioning device 50 adjusts the temperature of the space in which the laminate 200 is disposed such that the temperatures of the matrix resins are maintained at temperatures lower than the softening point at the first region A1, the fourth region A4, and the fifth region A5 of the laminate 200 due to heat transmission from the space (a maintaining step). The air conditioning device 50 maintains the temperature of the space at a temperature lower than the softening point of the matrix resins by sucking a gas present in the space in which the laminate 200 is disposed and discharging the gas cooled by a cooling source (not shown) into the space, for example.

As shown in FIG. 14, a pair of shaping rollers 11A (the back surface side of the laminate 200 is not shown) is provided instead of the pair of cooling rollers 11a and 11b of the upstream side shaping unit 10 of the first embodiment. In addition, a pair of shaping rollers 12A (the back surface side of the laminate 200 is not shown) is provided instead of the pair of cooling rollers 12a and 12b of the upstream side shaping unit 10 of the first embodiment. In addition, a pair of shaping rollers 13A (the back surface side of the laminate 200 is not shown) is provided instead of the pair of cooling rollers 13a and 13b of the upstream side shaping unit 10 of the first embodiment.

The pair of shaping rollers 11A is disposed at the same position as the pair of cooling rollers 11a and 11b of the first embodiment and has the same shape as the pair of cooling rollers 11a and 11b. However, the pair of shaping rollers 11A is different from the pair of cooling rollers 11a and 11b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the first region A1 of the laminate 200 by means of the pair of shaping rollers 11A in which no cooling mechanism is provided.

In addition, the pair of shaping rollers 12A is disposed at the same position as the pair of cooling rollers 12a and 12b of the first embodiment and has the same shape as the pair of cooling rollers 12a and 12b. However, the pair of shaping rollers 12A is different from the pair of cooling rollers 12a and 12b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the fourth region A4 of the laminate 200 by means of the pair of shaping rollers 12A in which no cooling mechanism is provided.

The pair of shaping rollers 13A is disposed at the same position as the pair of cooling rollers 13a and 13b of the first embodiment and has the same shape as the pair of cooling rollers 13a and 13b. However, the pair of shaping rollers 13A is different from the pair of cooling rollers 13a and 13b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the fifth region A5 of the laminate 200 by means of the pair of shaping rollers 13A in which no cooling mechanism is provided.

As shown in FIG. 14, a pair of shaping rollers 21A (the back surface side of the laminate 200 is not shown) is provided instead of the pair of cooling rollers 21a and 21b of the intermediate shaping unit 20 of the first embodiment. In addition, a pair of shaping rollers 22A (the back surface side of the laminate 200 is not shown) is provided instead of the pair of cooling rollers 22a and 22b of the intermediate shaping unit 20 of the first embodiment. In addition, a pair of shaping rollers 23A (the back surface side of the laminate 200 is not shown) is provided instead of the pair of cooling rollers 23a and 23b of the intermediate shaping unit 20 of the first embodiment.

The pair of shaping rollers 21A is disposed at the same position as the pair of cooling rollers 21a and 21b of the first embodiment and has the same shape as the pair of cooling rollers 21a and 21b. However, the pair of shaping rollers 21A is different from the pair of cooling rollers 21a and 21b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the first region A1 of the laminate 200 by means of the pair of shaping rollers 21A in which no cooling mechanism is provided.

The pair of shaping rollers 22A is disposed at the same position as the pair of cooling rollers 22a and 22b of the first embodiment and has the same shape as the pair of cooling rollers 22a and 22b. However, the pair of shaping rollers 22A is different from the pair of cooling rollers 22a and 22b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the fourth region A4 of the laminate 200 by means of the pair of shaping rollers 22A in which no cooling mechanism is provided.

The pair of shaping rollers 23A is disposed at the same position as the pair of cooling rollers 23a and 23b of the first embodiment and has the same shape as the pair of cooling rollers 23a and 23b. However, the pair of shaping rollers 23A is different from the pair of cooling rollers 23a and 23b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the fifth region A5 of the laminate 200 by means of the pair of shaping rollers 23A in which no cooling mechanism is provided.

As shown in FIG. 14, a pair of shaping rollers 31A is provided instead of the pair of cooling rollers 31a and 31b of the downstream side shaping unit 30 of the first embodiment. In addition, a pair of shaping rollers 32A is provided instead of the pair of cooling rollers 32a and 33b of the downstream side shaping unit 30 of the first embodiment. In addition, a pair of shaping rollers 33A is provided instead of the pair of cooling rollers 33a and 33b of the downstream side shaping unit 30 of the first embodiment.

The pair of shaping rollers 31A is disposed at the same position as the pair of cooling rollers 31a and 31b of the first embodiment and has the same shape as the pair of cooling rollers 31a and 31b. However, the pair of shaping rollers 31A is different from the pair of cooling rollers 31a and 31b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the first region A1 of the laminate 200 by means of the pair of shaping rollers 31A in which no cooling mechanism is provided.

The pair of shaping rollers 32A is disposed at the same position as the pair of cooling rollers 32a and 32b of the first embodiment and has the same shape as the pair of cooling rollers 32a and 32b. However, the pair of shaping rollers 32A is different from the pair of cooling rollers 32a and 32b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the fourth region A4 of the laminate 200 by means of the pair of shaping rollers 32A in which no cooling mechanism is provided.

The pair of shaping rollers 33A is disposed at the same position as the pair of cooling rollers 33a and 33b of the first embodiment and has the same shape as the pair of cooling rollers 33a and 33b. However, the pair of shaping rollers 33A is different from the pair of cooling rollers 33a and 33b in that no cooling mechanism is provided therein. In the present embodiment, since the temperatures of the matrix resins are maintained at temperatures lower than the softening point due to heat transmission from the space in which the laminate 200 is disposed, it is possible to shape the laminate 200 while suppressing interlayer slip deformation at the fifth region A5 of the laminate 200 by means of the pair of shaping rollers 33A in which no cooling mechanism is provided.

Fourth Embodiment

Figure 15:
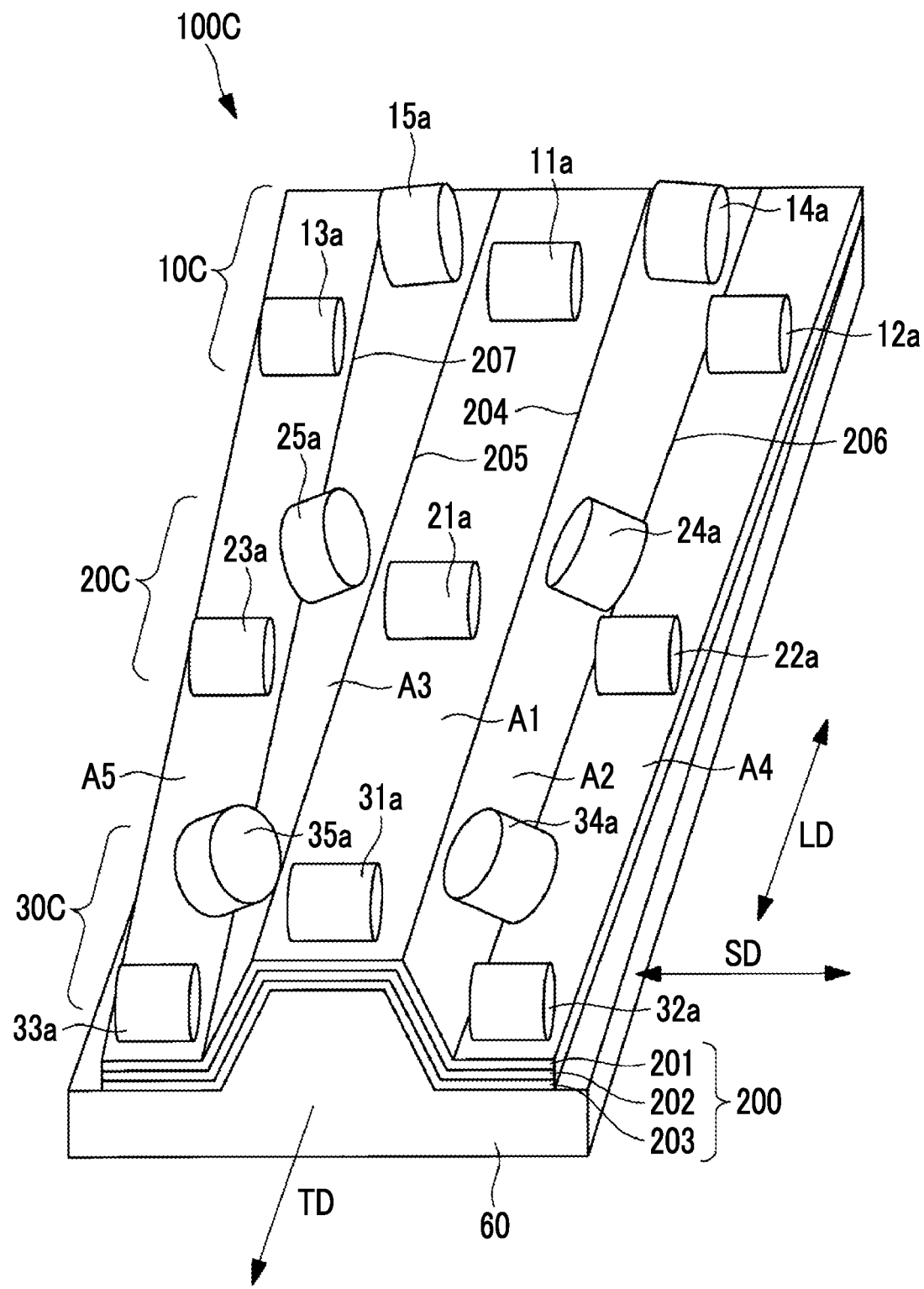
FIG. 15 is a perspective view showing a shaping device according to a fourth embodiment of the present disclosure.
Figure 16:
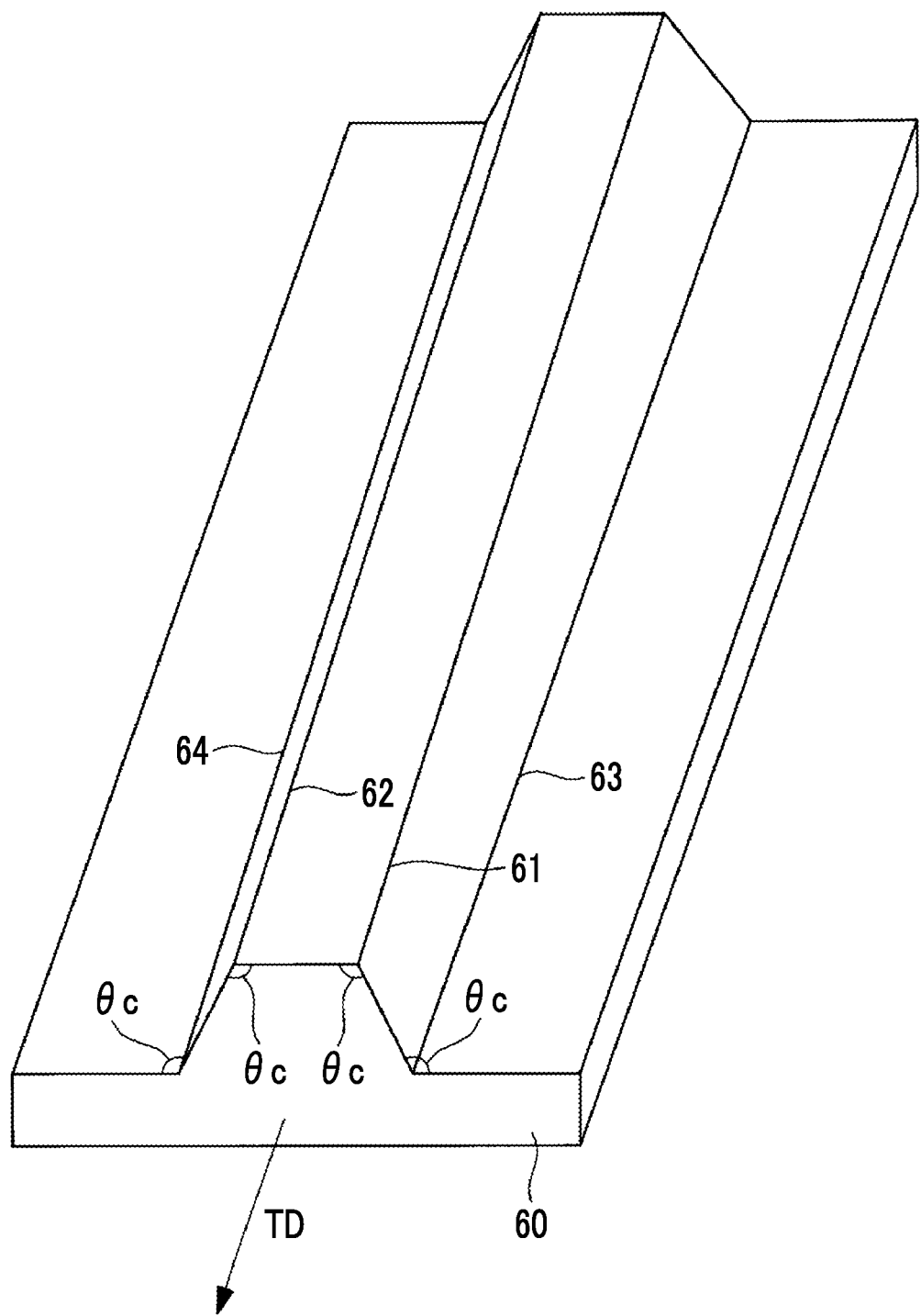
FIG. 16 is a perspective view showing a shaping die in FIG. 15.

Next, a shaping device 100C according to a fourth embodiment of the present disclosure and a method of shaping the laminate 200 in which the shaping device 100C is used will be described with reference to the drawings. FIG. 15 is a perspective view showing the shaping device 100C according to the fourth embodiment of the present disclosure. FIG. 16 is a perspective view showing a shaping die 60 in FIG. 15. The present embodiment is a modification example of the first embodiment, is the same as the first embodiment except for a case particularly described below, and the description thereof will be omitted below.

In the first embodiment, the laminate 200 is shaped in a state where both surfaces of the laminate 200 are clamped by a pair of rollers at each of the upstream side shaping unit 10, the intermediate shaping unit 20, and the downstream side shaping unit 30. On the other hand, in the present embodiment, rollers are brought into contact with an upper surface of the laminate 200 and a lower surface of the laminate 200 is supported by a shaping die.

As shown in FIG. 15, the shaping device 100C of the present embodiment includes the shaping die 60 that supports the lower surface of the laminate 200. Together with the laminate 200, the shaping die 60 is transported relative to the fixed shaping device 100C along the transport direction TD. As shown in FIG. 16, the shaping die 60 extends in the transport direction TD (the longitudinal direction LD of the laminate 200) and includes shoulder portions 61 and 62 and valley portions 63 and 64 for shaping the laminate 200 with the bending angles θc.

In the shaping device 100C of the present embodiment, an upstream side shaping unit 10C does not include the cooling rollers 11b, 12b, and 13b shown in FIG. 4. In addition, the upstream side shaping unit 10C does not include the heating rollers 14*b* and 15*b* shown in FIG. 3. In the present embodiment, the laminate 200 is shaped by means of the cooling rollers 11*a*, 12*a*, and 13*a* and the heating rollers 14*a* and 15*a* of the upstream side shaping unit 10C, in the upstream side shaping step shown in FIG. 9. In the upstream side shaping step, the lower surface of the laminate 200 is in a state of being not in contact with the shaping die 60.

In the shaping device 100C of the present embodiment, an intermediate shaping unit 20C does not include the cooling rollers 21*b*, 22*b*, and 23*b* shown in FIG. 6. In addition, the intermediate shaping unit 20C does not include the heating rollers 24*b* and 25*b* shown in FIG. 5. In the present embodiment, the laminate 200 is shaped by means of the cooling rollers 21*a*, 22*a*, and 23*a* and the heating rollers 24*a* and 25*a* of the intermediate shaping unit 20C, in the intermediate shaping step shown in FIG. 9. In the intermediate shaping step, the lower surface of the laminate 200 is in a state of being not in contact with the shaping die 60.

In the shaping device 100C of the present embodiment, a downstream side shaping unit 30C does not include the cooling rollers 31*b*, 32*b*, and 33*b* shown in FIG. 8. In addition, the downstream side shaping unit 30C does not include the heating rollers 34*b* and 35*b* shown in FIG. 7. In the present embodiment, the laminate 200 is shaped by means of the cooling rollers 31*a*, 32*a*, and 33*a* and the heating rollers 34*a* and 35*a* of the downstream side shaping unit 30C, in the downstream side shaping step shown in FIG. 9. In the downstream side shaping step, the lower surface of the laminate 200 enters a state of being in contact with the shaping die 60.

In the downstream side shaping step of the present embodiment, the first region A1 is brought into contact with both of the shaping die 60 and the cooling roller 31*a*, the fourth region A4 is brought into contact with both of the shaping die 60 and the cooling roller 32*a*, and the fifth region A5 is brought into contact with both of the shaping die 60 and the cooling roller 33*a*. In addition, the second region A2 is brought into contact with both of the shaping die 60 and the heating roller 34*a* and the third region is brought into contact with both of the shaping die 60 and the heating roller 35*a*. Accordingly, the laminate 200 is shaped while being in contact with both of the downstream side shaping unit 30 and the shaping die 60.

Other Embodiments

In the above description, the heating rollers are adopted as structures that heat the laminate 200 while transporting the laminate 200 and the cooling rollers are adopted as structures that cool the laminate 200 while transporting the laminate 200. However, another configuration may also be adopted. For example, a transport mechanism (not shown) that transports the laminate 200 may be adopted and a heating structure and a cooling structure that comes into contact with the laminate 200 or is separated from the laminate 200 may be adopted separately from the transport mechanism. For example, as the heating structure and the cooling structure, a mechanism that comes into contact with the laminate 200 or is separated from the laminate 200 by moving upward and downward may be adopted.

In this case, a configuration, in which the laminate 200 is intermittently transported such that the laminate 200 is transported by a predetermined distance along the transport direction TD each time the transportation of the laminate 200 is performed and the heating structure and the cooling structure move downward to come into contact with the laminate 200 during stoppage of the transportation so that the laminate 200 is heated and cooled, can be adopted.

In addition, in the case of the shaping device in the above description, three shaping units, which are the upstream side shaping unit 10 (10A, 10B, or 10C), the intermediate shaping unit 20 (20A, 20B, or 20C), and the downstream side shaping unit 30 (30A, 30B, or 30C), are disposed in order from the upstream side in the transport direction TD of the laminate 200. However, another configuration may also be adopted. For example, the number of shaping units disposed in the transport direction TD of the laminate 200 may be any number equal to or greater than two.

In addition, in the above description, the shaping device 100 (100A or 100B) folds the laminate 200, which is formed in a flat shape, along the mountain fold lines 204 and 205 and the valley fold lines 206 and 207 to shape the laminate 200 into a shape of which a cross section orthogonal to the transport direction TD has a hat-like shape. However, another configuration may also be adopted. The shaping device may shape the laminate into other shapes folded along any number of mountain fold lines and valley fold lines, for example. Examples of the other shapes include a shape that is folded along a single mountain fold line and of which a cross section orthogonal to the transport direction TD has an L-like shape, a shape that is folded along two mountain fold lines and of which a cross section orthogonal to the transport direction TD has a channel (C-like) shape, and a shape that is folded along a single mountain fold line and a single valley fold line and of which a cross section orthogonal to the transport direction TD has a Z-like shape.

The shaping method described in the embodiment described above is understood as follows, for example.

A shaping method according to the present disclosure is a shaping method of shaping a laminate (200) that is formed in a flat shape by laminating a plurality of sheet-shaped composite materials each including a fiber base material and a resin material, the method including a first shaping step (S104) of shaping the laminate along a fold line (204) extending along a longitudinal direction (LD) of the laminate such that a first bending angle (θb) is formed between a first region (A1) and a second region (A2) that are disposed with the fold line interposed therebetween and a second shaping step (S105) of shaping the laminate shaped in the first shaping step along the fold line such that a second bending angle smaller than the first bending angle is formed between the first region and the second region. In the first shaping step and the second shaping step, the laminate is shaped in a state where a temperature of the first region is maintained at a temperature lower than a softening point of the resin material and the second region is heated to a temperature equal to or higher than the softening point.

According to the shaping method of the present disclosure, when the laminate that is formed in the flat shape by laminating the plurality of sheet-shaped composite materials each including the fiber base material and the resin material is shaped along the fold line, the laminate is shaped such that the first bending angle is formed between the first region and the second region that are disposed with the fold line interposed therebetween in the first shaping step. In addition, in the second shaping step, the laminate is shaped such that the second bending angle smaller than the first bending angle is formed between the first region and the second region. With the first shaping step and the second shaping step, the first region and the second region of the laminated formed in the flat shape that are disposed with the fold line interposed therebetween can be shaped in a stepwise manner from a state where the first bending angle is formed therebetween to a state where the second bending angle smaller than the first bending angle is formed therebetween.

In addition, according to the shaping method of the present disclosure, in each of the first shaping step and the second shaping step, the laminate can be shaped in a state where the temperature of the first region is maintained at a temperature lower than the softening point of the resin material and the second region is heated to a temperature equal to or higher than the softening point. Therefore, interlayer slip deformation between the plurality of sheet-shaped composite materials is suppressed in the first region and interlayer slip deformation between the plurality of sheet-shaped composite materials is promoted in the second region. Accordingly, the plurality of composite materials are restrained from being shifted in the first region and a stress that is generated in the laminate due to the shaping of the laminate is released in the second region and thus a problem that the entire vicinity of the fold line is heated and the laminate is not shaped desirably can be suppressed.

In the shaping method according to the present disclosure, in the first shaping step, the laminate is shaped by bringing a first cooling roller (21a and 21b) that rotates in a direction for transporting the laminate in a transport direction (TD) along the longitudinal direction and of which a temperature is maintained at a temperature lower than the softening point into contact with the first region (A1) and bringing a first heating roller (24a and 24b) that rotates in a direction for transporting the laminate in the transport direction and that is heated to a temperature equal to or higher than the softening point into contact with the second region and in the second shaping step, the laminate is shaped by bringing a second cooling roller (31a and 31b) that rotates in a direction for transporting the laminate in the transport direction and of which a temperature is maintained at a temperature lower than the softening point into contact with the first region and bringing a second heating roller (34a and 34b) that rotates in a direction for transporting the laminate in the transport direction and that is heated to a temperature equal to or higher than the softening point into contact with the second region.

According to the above-described shaping method, the laminate can be shaped in a state where the temperature of the first region is maintained at a temperature lower than the softening point and the second region is heated to a temperature equal to or higher than the softening point by bringing the first cooling roller of which the temperature is maintained at a temperature lower than the softening point of the resin material into contact with the first region and bringing the first heating roller that is heated to a temperature equal to or higher than the softening point into contact with the second region in the first shaping step. In addition, the laminate can be shaped in a state where the temperature of the first region is maintained at a temperature lower than the softening point and the second region is heated to a temperature equal to or higher than the softening point by bringing the second cooling roller of which the temperature is maintained at a temperature lower than the softening point into contact with the first region and bringing the second heating roller that is heated to a temperature equal to or higher than the softening point into contact with the second region in the second shaping step.

In the above-described shaping method, in the first shaping step, the laminate is moved relative to the first heating roller and the first cooling roller along the longitudinal direction so that each position in the longitudinal direction of the laminate is continuously shaped and in the second shaping step, the laminate is moved relative to the second heating roller and the second cooling roller along the longitudinal direction so that each position in the longitudinal direction of the laminate is continuously shaped.

According to the above-described shaping method, each position in the longitudinal direction of the laminate is continuously shaped such that the first bending angle is formed in the first shaping step and is continuously shaped such that the second bending angle is formed in the second shaping step thereafter. Accordingly, each position in the longitudinal direction of the laminate is continuously shaped through the first shaping step and the second shaping step and thus a time taken to form a composite material can be shortened.

In the above-described shaping method, in the first shaping step, the laminate is shaped by bringing a pair of the first cooling rollers that is disposed such that the first cooling rollers face each other with the laminate interposed therebetween into contact with both surfaces of the first region and bringing a pair of the first heating rollers that is disposed such that the first heating rollers face each other with the laminate interposed therebetween into contact with both surfaces of the second region and in the second shaping step, the laminate is shaped by bringing a pair of the second cooling rollers that is disposed such that the second cooling rollers face each other with the laminate interposed therebetween into contact with both surfaces of the first region and bringing a pair of the second heating rollers that is disposed such that the second heating rollers face each other with the laminate interposed therebetween into contact with both surfaces of the second region.

According to the above-described shaping method, the temperatures of both surfaces of the first region of the laminate can be maintained at temperatures lower than the softening point by means of the pair of first cooling rollers, both surfaces of the second region of the laminate can be heated to temperatures equal to or higher than the softening point by means of the pair of first heating rollers, and each position in the longitudinal direction of the laminate can be continuously shaped in the first shaping step. In addition, the temperatures of both surfaces of the first region of the laminate can be maintained at temperatures lower than the softening point by means of the pair of second cooling rollers, both surfaces of the second region of the laminate can be heated to temperatures equal to or higher than the softening point by means of the pair of second heating rollers, and each position in the longitudinal direction of the laminate can be continuously shaped in the second shaping step.

In the above-described shaping method, in the second shaping step, the laminate is shaped by bringing the first region into contact with both of a shaping die (60) and the second cooling roller and bringing the second region into contact with both of the shaping die and the second heating roller, the shaping die extending along the longitudinal direction and including a shoulder portion (61) for shaping the laminate with the second bending angle.

According to the above-described shaping method, the temperature of one surface of the first region of the laminate can be maintained at a temperature lower than the softening point with the laminate interposed between the shoulder portion of the shaping die and the second cooling roller, one surface of the second region of the laminate can be heated to a temperature equal to or higher than the softening point with the laminate interposed between the shoulder portion of the shaping die and the second heating roller, and each position in the longitudinal direction of the laminate can be continuously shaped in the second shaping step.

The above-described shaping method further includes a heating step of heating a space in which the laminate is disposed such that a temperature of the second region of the laminate becomes equal to or higher than the softening point due to heat transmission from the space when the first shaping step and the second shaping step are performed. In the first shaping step, the laminate is shaped by bringing a first cooling roller (21a) that rotates in a direction for transporting the laminate in a transport direction along the longitudinal direction and of which a temperature is maintained at a temperature lower than the softening point into contact with the first region and bringing a first shaping roller (24A) that rotates in a direction for transporting the laminate in the transport direction into contact with the first region and in the second shaping step, the laminate is shaped by bringing a second cooling roller (31a) that rotates in a direction for transporting the laminate in the transport direction and of which a temperature is maintained at a temperature lower than the softening point into contact with the first region and bringing a second shaping roller (34A) that rotates in a direction for transporting the laminate in the transport direction into contact with the second region.

According to the above-described shaping method, the space in which the laminate is disposed is heated such that the temperature of the second region of the laminate becomes equal to or higher than the softening point when the first shaping step and the second shaping step are performed. Therefore, the laminate can be shaped in a state where the temperature of the first region is maintained at a temperature lower than the softening point and the second region is heated to a temperature equal to or higher than the softening point by bringing the first cooling roller of which the temperature is maintained at a temperature lower than the softening point into contact with the first region and bringing the first shaping roller into contact with the second region in the first shaping step. In addition, the laminate can be shaped in a state where the temperature of the first region is maintained at a temperature lower than the softening point and the second region is heated to a temperature equal to or higher than the softening point by bringing the second cooling roller of which the temperature is maintained at a temperature lower than the softening point into contact with the first region and bringing the second shaping roller into contact with the second region in the second shaping step.

The above-described shaping method further includes a step of maintaining a temperature of a space in which the laminate is disposed such that a temperature of the first region of the laminate becomes lower than the softening point due to heat transmission from the space when the first shaping step and the second shaping step are performed. In the first shaping step, the laminate is shaped by bringing a first shaping roller (21B) that rotates in a direction for transporting the laminate in a transport direction (TD) along the longitudinal direction into contact with the first region and bringing a first heating roller (24a and 24b) that rotates in a direction for transporting the laminate in the transport direction and that is heated to a temperature equal to or higher than the softening point into contact with the second region and in the second shaping step, the laminate is shaped by bringing a second shaping roller (31B) that rotates in a direction for transporting the laminate (200) in the transport direction (TD) into contact with the first region and bringing a second heating roller (34a and 34b) that rotates in a direction for transporting the laminate (200) in the transport direction (TD) and that is heated to a temperature equal to or higher than the softening point into contact with the second region.

According to the above-described shaping method, the temperature of the space in which the laminate is disposed is maintained such that the temperature of the first region of the laminate becomes lower than the softening point when the first shaping step and the second shaping step are performed. Therefore, the laminate can be shaped in a state where the temperature of the first region is maintained at a temperature lower than the softening point and the second region is heated to a temperature equal to or higher than the softening point by bringing the first shaping roller into contact with the first region and bringing the first heating roller that is heated to a temperature equal to or higher than the softening point into contact with the second region in the first shaping step. In addition, the laminate can be shaped in a state where the temperature of the first region is maintained at a temperature lower than the softening point and the second region is heated to a temperature equal to or higher than the softening point by bringing the second shaping roller into contact with the first region and bringing the second heating roller that is heated to a temperature equal to or higher than the softening point into contact with the second region in the second shaping step.

The shaping device described in each embodiment described above is understood as follows, for example.

A shaping device (100) according to the present disclosure is a shaping device which shapes a laminate (200) that is formed in a flat shape by laminating sheet-shaped composite materials (201, 202, and 203) each including a fiber base material and a resin material, the device including a first shaping unit (20) that shapes the laminate along a fold line (204) extending along a longitudinal direction (LD) of the laminate such that a first bending angle ($\theta b$) is formed between a first region (A1) and a second region (A2) that are disposed with the fold line interposed therebetween and a second shaping unit (30) that shapes the laminate shaped by the first shaping unit along the fold line such that a second bending angle ($\theta c$) smaller than the first bending angle is formed between the first region and the second region. The first shaping unit and the second shaping unit shape the laminate in a state where a temperature of the first region is maintained at a temperature lower than a softening point of the resin material and the second region is heated to a temperature equal to or higher than the softening point.

According to the shaping device of the present disclosure, when the laminate that is formed in the flat shape by laminating the plurality of sheet-shaped composite materials each including the fiber base material and the resin material is shaped along the fold line, the laminate is shaped by the first shaping unit such that the first bending angle is formed between the first region and the second region that are disposed with the fold line interposed therebetween. In addition, the laminate is shaped by the second shaping unit such that the second bending angle smaller than the first bending angle is formed between the first region and the second region. With the first shaping unit and the second shaping unit, the first region and the second region of the laminated formed in the flat shape that are disposed with the fold line interposed therebetween can be shaped in a stepwise manner from a state where the first bending angle is formed therebetween to a state where the second bending angle smaller than the first bending angle is formed therebetween.

In addition, according to the shaping device of the present disclosure, each of the first shaping unit and the second shaping unit can shape the laminate in a state where the temperature of the first region is maintained at a temperature lower than the softening point and the second region is heated to a temperature equal to or higher than the softening point. Therefore, interlayer slip deformation between the plurality of sheet-shaped composite materials is suppressed in the first region and interlayer slip deformation between the plurality of sheet-shaped composite materials is promoted in the second region. Accordingly, the plurality of composite materials are restrained from being shifted in the first region and a stress that is generated in the laminate due to the shaping of the laminate is released in the second region and thus a problem that the entire vicinity of the fold line is heated and the laminate is not shaped desirably can be suppressed.

In the shaping device according to the present disclosure, the first shaping unit shapes the laminate by bringing a first cooling roller that rotates in a direction for transporting the laminate in a transport direction along the longitudinal direction and of which a temperature is maintained at a temperature lower than the softening point into contact with the first region and bringing a first heating roller that rotates in a direction for transporting the laminate in the transport direction and that is heated to a temperature equal to or higher than the softening point into contact with the second region and the second shaping unit shapes the laminate by bringing a second cooling roller that rotates in a direction for transporting the laminate in the transport direction and of which a temperature is maintained at a temperature lower than the softening point into contact with the first region and bringing a second heating roller that rotates in a direction for transporting the laminate in the transport direction and that is heated to a temperature equal to or higher than the softening point into contact with the second region.

According to the above-described shaping device, the first shaping unit can shape the laminate in a state where the temperature of the first region is maintained at a temperature lower than the softening point and the second region is heated to a temperature equal to or higher than the softening point by bringing the first cooling roller of which the temperature is maintained at a temperature lower than the softening point of the resin material into contact with the first region and bringing the first heating roller that is heated to a temperature equal to or higher than the softening point into contact with the second region. In addition, the second shaping unit can shape the laminate in a state where the temperature of the first region is maintained at a temperature lower than the softening point and the second region is heated to a temperature equal to or higher than the softening point by bringing the second cooling roller of which the temperature is maintained at a temperature lower than the softening point into contact with the first region and bringing the second heating roller that is heated to a temperature equal to or higher than the softening point into contact with the second region.

In the above-described shaping device, the first shaping unit moves the laminate relative to the first heating roller and the first cooling roller along the longitudinal direction so that each position in the longitudinal direction of the laminate is continuously shaped, and the second shaping unit moves laminate relative to the second heating roller and the second cooling roller along the longitudinal direction so that each position in the longitudinal direction of the laminate is continuously shaped.

According to the above-described shaping device, each position in the longitudinal direction of the laminate is continuously shaped by the first shaping unit such that the first bending angle is formed and is continuously shaped by the second shaping unit such that the second bending angle is formed thereafter. Accordingly, each position in the longitudinal direction of the laminate are continuously shaped by the first shaping unit and the second shaping unit and thus a time taken to form a composite material can be shortened.

In the above-described shaping device, the first shaping unit shapes the laminate by bringing a pair of the first cooling rollers that is disposed such that the first cooling rollers face each other with the laminate interposed therebetween into contact with both surfaces of the first region and bringing a pair of the first heating rollers that is disposed such that the first heating rollers face each other with the laminate interposed therebetween into contact with both surfaces of the second region and the second shaping unit shapes the laminate by bringing a pair of the second cooling rollers that is disposed such that the second cooling rollers face each other with the laminate interposed therebetween into contact with both surfaces of the first region and bringing a pair of the second heating rollers that is disposed such that the second heating rollers face each other with the laminate interposed therebetween into contact with both surfaces of the second region.

According to the above-described shaping device, the temperatures of both surfaces of the first region of the laminate can be maintained at temperatures lower than the softening point by means of the pair of first cooling rollers, both surfaces of the second region of the laminate can be heated to temperatures equal to or higher than the softening point by means of the pair of first heating rollers, and each position in the longitudinal direction of the laminate can be continuously shaped by the first shaping unit. In addition, the temperatures of both surfaces of the first region of the laminate can be maintained at temperatures lower than the softening point by means of the pair of second cooling rollers, both surfaces of the second region of the laminate can be heated to temperatures equal to or higher than the softening point by means of the pair of second heating rollers, and each position in the longitudinal direction of the laminate can be continuously shaped by the second shaping unit.

In the above-described shaping device, the second shaping unit shapes the laminate by bringing the first region into contact with both of a shaping die and the second cooling roller and bringing the second region into contact with both of the shaping die and the second heating roller, the shaping die extending along the longitudinal direction and including a shoulder portion for shaping the laminate with the second bending angle.

According to the above-described shaping device, the temperature of one surface of the first region of the laminate can be maintained at a temperature lower than the softening point with the laminate interposed between the shoulder portion of the shaping die and the second cooling roller, one surface of the second region of the laminate can be heated to a temperature equal to or higher than the softening point with the laminate interposed between the shoulder portion of the shaping die and the second heating roller, and each position in the longitudinal direction of the laminate can be continuously shaped by the second shaping unit.

REFERENCE SIGNS LIST 10, 10A, 10B, 10C: upstream side shaping unit
11*a*, 11*b*, 12*a*, 12*b*, 13*a*, 13*b*: cooling roller
11A, 12A, 13A, 14A, 15A: shaping roller
14*a*, 14*b*, 15*a*, 15*b*: heating roller
20, 20A, 20B, 20C: intermediate shaping unit (first shaping unit)
21*a*, 21*b*, 22*a*, 22*b*, 23*a*, 23*b*: cooling roller 21A, 22A, 23A, 24A, 25A: shaping roller
24a, 24b, 25a, 25b: heating roller
30, 30A, 30B, 30C: downstream side shaping unit (second shaping unit)
31a, 31b, 32a, 32b, 33a, 33b: cooling roller
31A, 32A, 33A, 34A, 35A: shaping roller
34a, 34b, 35a, 35b: heating roller
40: heating device
50: air conditioning device
60: shaping die
61, 62: shoulder portion
63, 64: valley portion
100, 100A, 100B, 100C: shaping device
200: laminate
201, 202, 203: composite material
204, 205: mountain fold line (fold line)
206, 207: valley fold line
A1: first region
A2: second region
A3: third region
A4: fourth region
A5: fifth region
LD: longitudinal direction
SD: lateral direction
TD: transport direction
θa, θb, θc: bending angle

The invention claimed is:

1. A shaping method of shaping a laminate that is formed in a flat shape by laminating a plurality of sheet-shaped composite materials each including a fiber base material and a resin material, the method comprising:
a first shaping step of shaping the laminate along a fold line extending along a longitudinal direction of the laminate such that a first bending angle is formed between a first region and a second region that are disposed with the fold line interposed therebetween; and
a second shaping step of shaping the laminate shaped in the first shaping step along the fold line such that a second bending angle smaller than the first bending angle is formed between the first region and the second region,
wherein, in the first shaping step and the second shaping step, the laminate is shaped in a state where a temperature of the first region is maintained at a temperature lower than a softening point of the resin material and the second region is heated to a temperature equal to or higher than the softening point,
wherein, in the first shaping step, the laminate is shaped by bringing a first cooling roller that rotates in a direction for transporting the laminate in a transport direction along the longitudinal direction and of which a temperature is maintained at a temperature lower than the softening point into contact with the first region and bringing a first heating roller that rotates in a direction for transporting the laminate in the transport direction and that is heated to a temperature equal to or higher than the softening point into contact with the second region, and
in the second shaping step, the laminate is shaped by bringing a second cooling roller that rotates in a direction for transporting the laminate in the transport direction and of which a temperature is maintained at a temperature lower than the softening point into contact with the first region and bringing a second heating roller that rotates in a direction for transporting the laminate in the transport direction and that is heated to a temperature equal to or higher than the softening point into contact with the second region.

2. The shaping method according to claim 1,
wherein, in the first shaping step, the laminate is moved relative to the first heating roller and the first cooling roller along the longitudinal direction so that each position in the longitudinal direction of the laminate is continuously shaped, and
in the second shaping step, the laminate is moved relative to the second heating roller and the second cooling roller along the longitudinal direction so that each position in the longitudinal direction of the laminate is continuously shaped.

3. The shaping method according to claim 1,
wherein, in the first shaping step, the laminate is shaped by bringing a pair of the first cooling rollers that is disposed such that the first cooling rollers face each other with the laminate interposed therebetween into contact with both surfaces of the first region and bringing a pair of the first heating rollers that is disposed such that the first heating rollers face each other with the laminate interposed therebetween into contact with both surfaces of the second region, and
in the second shaping step, the laminate is shaped by bringing a pair of the second cooling rollers that is disposed such that the second cooling rollers face each other with the laminate interposed therebetween into contact with both surfaces of the first region and bringing a pair of the second heating rollers that is disposed such that the second heating rollers face each other with the laminate interposed therebetween into contact with both surfaces of the second region.

4. The shaping method according to claim 1,
wherein, in the second shaping step, the laminate is shaped by bringing the first region into contact with both of a shaping die and the second cooling roller and bringing the second region into contact with both of the shaping die and the second heating roller, the shaping die extending along the longitudinal direction and including a shoulder portion for shaping the laminate with the second bending angle.

5. A shaping method of shaping a laminate that is formed in a flat shape by laminating a plurality of sheet-shaped composite materials each including a fiber base material and a resin material, the method comprising:
a first shaping step of shaping the laminate along a fold line extending along a longitudinal direction of the laminate such that a first bending angle is formed between a first region and a second region that are disposed with the fold line interposed therebetween; and
a second shaping step of shaping the laminate shaped in the first shaping step along the fold line such that a second bending angle smaller than the first bending angle is formed between the first region and the second region,
wherein, in the first shaping step and the second shaping step, the laminate is shaped in a state where a temperature of the first region is maintained at a temperature lower than a softening point of the resin material and the second region is heated to a temperature equal to or higher than the softening point,
a heating step of heating a space in which the laminate is disposed such that a temperature of the second region of the laminate becomes equal to or higher than the softening point due to heat transmission from the space when the first shaping step and the second shaping step are performed, wherein, in the first shaping step, the laminate is shaped by bringing a first cooling roller that rotates in a direction for transporting the laminate in a transport direction along the longitudinal direction and of which a temperature is maintained at a temperature lower than the softening point into contact with the first region and bringing a first shaping roller that rotates in a direction for transporting the laminate in the transport direction into contact with the second region, and in the second shaping step, the laminate is shaped by bringing a second cooling roller that rotates in a direction for transporting the laminate in the transport direction and of which a temperature is maintained at a temperature lower than the softening point into contact with the first region and bringing a second shaping roller that rotates in a direction for transporting the laminate in the transport direction into contact with the second region.

6. The shaping method according to claim 1, further comprising:

a step of maintaining a temperature of a space in which the laminate is disposed such that a temperature of the first region of the laminate becomes lower than the softening point due to heat transmission from the space when the first shaping step and the second shaping step are performed, wherein, in the first shaping step, the laminate is shaped by bringing a first shaping roller that rotates in a direction for transporting the laminate in a transport direction along the longitudinal direction into contact with the first region and bringing a first heating roller that rotates in a direction for transporting the laminate in the transport direction and that is heated to a temperature equal to or higher than the softening point into contact with the second region, and in the second shaping step, the laminate is shaped by bringing a second shaping roller that rotates in a direction for transporting the laminate in the transport direction into contact with the first region and bringing a second heating roller that rotates in a direction for transporting the laminate in the transport direction and that is heated to a temperature equal to or higher than the softening point into contact with the second region.

7. A shaping device which shapes a laminate that is formed in a flat shape by laminating sheet-shaped composite materials each including a fiber base material and a resin material, the device comprising:

a first shaping unit that shapes the laminate along a fold line extending along a longitudinal direction of the laminate such that a first bending angle is formed between a first region and a second region that are disposed with the fold line interposed therebetween; and a second shaping unit that shapes the laminate shaped by the first shaping unit along the fold line such that a second bending angle smaller than the first bending angle is formed between the first region and the second region, wherein the first shaping unit and the second shaping unit shape the laminate in a state where a temperature of the first region is maintained at a temperature lower than a softening point of the resin material and the second region is heated to a temperature equal to or higher than the softening point, wherein the first shaping unit shapes the laminate by bringing a first cooling roller that rotates in a direction for transporting the laminate in a transport direction along the longitudinal direction and of which a temperature is maintained at a temperature lower than the softening point into contact with the first region and bringing a first heating roller that rotates in a direction for transporting the laminate in the transport direction and that is heated to a temperature equal to or higher than the softening point into contact with the second region, and the second shaping unit shapes the laminate by bringing a second cooling roller that rotates in a direction for transporting the laminate in the transport direction and of which a temperature is maintained at a temperature lower than the softening point into contact with the first region and bringing a second heating roller that rotates in a direction for transporting the laminate in the transport direction and that is heated to a temperature equal to or higher than the softening point into contact with the second region, wherein the first shaping unit moves the laminate relative to the first heating roller and the first cooling roller along the longitudinal direction so that each position in the longitudinal direction of the laminate is continuously shaped, and the second shaping unit moves laminate relative to the second heating roller and the second cooling roller along the longitudinal direction so that each position in the longitudinal direction of the laminate is continuously shaped.

8. A shaping device which shapes a laminate that is formed in a flat shape by laminating sheet-shaped composite materials each including a fiber base material and a resin material, the device comprising:

a first shaping unit that shapes the laminate along a fold line extending along a longitudinal direction of the laminate such that a first bending angle is formed between a first region and a second region that are disposed with the fold line interposed therebetween; and a second shaping unit that shapes the laminate shaped by the first shaping unit along the fold line such that a second bending angle smaller than the first bending angle is formed between the first region and the second region, wherein the first shaping unit and the second shaping unit shape the laminate in a state where a temperature of the first region is maintained at a temperature lower than a softening point of the resin material and the second region is heated to a temperature equal to or higher than the softening point, wherein the first shaping unit shapes the laminate by bringing a first cooling roller that rotates in a direction for transporting the laminate in a transport direction along the longitudinal direction and of which a temperature is maintained at a temperature lower than the softening point into contact with the first region and bringing a first heating roller that rotates in a direction for transporting the laminate in the transport direction and that is heated to a temperature equal to or higher than the softening point into contact with the second region, and the second shaping unit shapes the laminate by bringing a second cooling roller that rotates in a direction for transporting the laminate in the transport direction and of which a temperature is maintained at a temperature lower than the softening point into contact with the first region and bringing a second heating roller that rotates in a direction for transporting the laminate in the transport direction and that is heated to a temperature equal to or higher than the softening point into contact with the second region, wherein the first shaping unit shapes the laminate by bringing a pair of the first cooling rollers that is disposed such that the first cooling rollers face each other with the laminate interposed therebetween into contact with both surfaces of the first region and bringing a pair of the first heating rollers that is disposed such that the first heating rollers face each other with the laminate interposed therebetween into contact with both surfaces of the second region, and the second shaping unit shapes the laminate by bringing a pair of the second cooling rollers that is disposed such that the second cooling rollers face each other with the laminate interposed therebetween into contact with both surfaces of the first region and bringing a pair of the second heating rollers that is disposed such that the second heating rollers face each other with the laminate interposed therebetween into contact with both surfaces of the second region.

9. A shaping device which shapes a laminate that is formed in a flat shape by laminating sheet-shaped composite materials each including a fiber base material and a resin material, the device comprising:

a first shaping unit that shapes the laminate along a fold line extending along a longitudinal direction of the laminate such that a first bending angle is formed between a first region and a second region that are disposed with the fold line interposed therebetween; and a second shaping unit that shapes the laminate shaped by the first shaping unit along the fold line such that a second bending angle smaller than the first bending angle is formed between the first region and the second region, wherein the first shaping unit and the second shaping unit shape the laminate in a state where a temperature of the first region is maintained at a temperature lower than a softening point of the resin material and the second region is heated to a temperature equal to or higher than the softening point, wherein the first shaping unit shapes the laminate by bringing a first cooling roller that rotates in a direction for transporting the laminate in a transport direction along the longitudinal direction and of which a temperature is maintained at a temperature lower than the softening point into contact with the first region and bringing a first heating roller that rotates in a direction for transporting the laminate in the transport direction and that is heated to a temperature equal to or higher than the softening point into contact with the second region, and the second shaping unit shapes the laminate by bringing a second cooling roller that rotates in a direction for transporting the laminate in the transport direction and of which a temperature is maintained at a temperature lower than the softening point into contact with the first region and bringing a second heating roller that rotates in a direction for transporting the laminate in the transport direction and that is heated to a temperature equal to or higher than the softening point into contact with the second region, and wherein the second shaping unit shapes the laminate by bringing the first region into contact with both of a shaping die and the second cooling roller and bringing the second region into contact with both of the shaping die and the second heating roller, the shaping die extending along the longitudinal direction and including a shoulder portion for shaping the laminate with the second bending angle.

* * * * *